(12) United States Patent
Murakami

(10) Patent No.: US 9,175,741 B2
(45) Date of Patent: Nov. 3, 2015

(54) HYDRAULIC SHOCK ABSORBER

(75) Inventor: Yosuke Murakami, Shizuoka (JP)

(73) Assignee: SHOWA CORPORATION, Saitama (JP)

( * ) Notice: Subject to any disclaimer, the term of this patent is extended or adjusted under 35 U.S.C. 154(b) by 36 days.

(21) Appl. No.: 13/503,839

(22) PCT Filed: Mar. 10, 2011

(86) PCT No.: PCT/JP2011/055662
§ 371 (c)(1),
(2), (4) Date: Apr. 24, 2012

(87) PCT Pub. No.: WO2011/161990
PCT Pub. Date: Dec. 29, 2011

(65) Prior Publication Data
US 2013/0081912 A1    Apr. 4, 2013

(30) Foreign Application Priority Data

Jun. 21, 2010 (JP) ................................. 2010-140807
Aug. 27, 2010 (JP) ................................. 2010-191240

(51) Int. Cl.
*F16F 9/34* (2006.01)
*F16F 9/516* (2006.01)
*F16F 9/06* (2006.01)
*F16F 9/32* (2006.01)
*F16F 9/348* (2006.01)

(52) U.S. Cl.
CPC ................. *F16F 9/5165* (2013.01); *F16F 9/06* (2013.01); *F16F 9/3235* (2013.01); *F16F 9/34* (2013.01); *F16F 9/348* (2013.01)

(58) Field of Classification Search
USPC ............. 188/322.13, 322.14, 322.15, 322.19, 188/313, 314, 315, 318
See application file for complete search history.

(56) References Cited

U.S. PATENT DOCUMENTS

| | | | | | |
|---|---|---|---|---|---|
| 4,971,180 | A | * | 11/1990 | Kobayashi et al. | ........ 188/282.4 |
| 5,246,092 | A | * | 9/1993 | Yamaoka | ..................... 188/315 |
| 7,066,310 | B2 | * | 6/2006 | Mintgen et al. | .......... 188/322.22 |

(Continued)

FOREIGN PATENT DOCUMENTS

| | | |
|---|---|---|
| EP | 2270355 A2 | 1/2011 |
| EP | 2487384 A1 | 8/2012 |

(Continued)

OTHER PUBLICATIONS

English-language abstract of JP 10267067.*

(Continued)

*Primary Examiner* — Nicholas J Lane
(74) *Attorney, Agent, or Firm* — Keith Orum; Orum & Roth LLC

(57) ABSTRACT

In a hydraulic shock absorber 10, at least one of a first base piston 50 and a second base piston 60 is provided with a communication path 44 communicating an intermediate portion between a compression side damping valve 51 and a compression side check valve 52 which are provided in respective compression side flow paths 50A, 60B of the first and second base pistons 50, 60 with an oil reservoir chamber 32, and communicating an intermediate portion between an extension side damping valve 61 and an extension side check valve 62 which are provided in respective extension side flow paths 60A, 50B of the first and second base pistons 50, 60 with the oil reservoir chamber 32.

11 Claims, 14 Drawing Sheets

(56) References Cited

U.S. PATENT DOCUMENTS

2010/0326780 A1* 12/2010 Murakami ............... 188/322.13
2012/0152671 A1*  6/2012 Murakami ................... 188/315
2012/0247890 A1* 10/2012 Murakami ................. 188/282.1

FOREIGN PATENT DOCUMENTS

| JP | 58-72744 | 4/1983 | |
| JP | 10267067 A * | 10/1998 | F16F 9/50 |
| JP | 2007-177877 | 7/2007 | |
| JP | 2008-82491 | 4/2008 | |
| JP | 2009133411 A * | 6/2009 | |
| JP | 2009-243530 | 10/2009 | |
| JP | 2010101422 A * | 5/2010 | |
| JP | 2011-027255 A | 2/2011 | |

OTHER PUBLICATIONS

English-language abstract of JP 2009-133411.*
Machine translation of JP 2010-101422.*

* cited by examiner

HYDRAULIC SHOCK ABSORBER

TECHNICAL FIELD

The present invention relates to a hydraulic shock absorber.

BACKGROUND ART

A conventional hydraulic shock absorber described in patent document 1 is structured, as shown in FIG. 7, such that a piston rod 2 which is attached to one of a vehicle body side and an axle side is inserted into an oil chamber of a cylinder 1 which is attached to another of the vehicle body side and the axle side. The oil chamber of the cylinder 1 is divided into a piston side oil chamber 4A and a rod side oil chamber 4B by a piston 3 which is provided in a leading end portion of the piston rod 2, and a damping force generating device 5 is provided in the piston 3. Further, an oil reservoir chamber 6 which compensates a volumetric capacity (including a volumetric capacity at a temperature expanding amount of an oil) of the piston rod 2 which goes to and out of the oil chambers 4A and 4B of the cylinder 1 is communicated with the piston side oil chamber 4A of the cylinder 1. And a valve housing 7 provided with a damping force generating device 8 is interposed between the piston side oil chamber 4A of the cylinder 1 and the oil reservoir chamber 6. The oil reservoir chamber 6 is pressurized by an air chamber 6A (a bladder, a free piston or the like may be interposed between the oil reservoir chamber 6 and the air chamber 6A).

The damping force generating device 5 is constructed by a compression side damping valve 5A which opens and closes a compression side flow path 3A provided in the piston 3, and an extension side damping valve 5B which opens and closes an extension side flow path 3B provided in the piston 3. The damping force generating device 8 is constructed by a compression side damping valve 8A which opens and closes a compression side flow path 7A provided in the valve housing 7, and an extension side damping valve 8B which opens and closes an extension side flow path 7B provided in the valve housing 7.

In a compression side stroke, oil in the piston side oil chamber 4A is boosted so as to flow out to the oil reservoir chamber 6 from the compression side damping valve 8A of the compression side flow path 7A and flow out to the rod side oil chamber 4B from the compression side damping valve 5A of the compression side flow path 3A, thereby generating a compression side damping force on the basis of a flow path resistance of the compression side damping valve 8A and the compression side damping valve 5A. At this time, the oil at an inserting volume of the piston rod 2 is discharged to the oil reservoir chamber 6 through the compression side damping valve 8A. In an extension side stroke, the oil in the rod side oil chamber 4B is boosted so as to flow out to the piston side oil chamber 4A from the extension side damping valve 5B of the extension side flow path 3B, thereby generating an extension side damping force on the basis of a flow path resistance of the extension side damping valve 5B, and the oil at a going-out volume of the piston rod 2 is replenished to the piston side oil chamber 4A from the oil reservoir chamber 6 through the extension side damping valve 8B of the extension side flow path 7B.

PRIOR ART DOCUMENT

Patent Document

Patent document 1: Japanese Patent Application Laid-Open No. 2007-177877

SUMMARY OF THE INVENTION

Problem to be Solved by the Invention

In the conventional hydraulic shock absorber, as shown in FIG. 7, in the compression side stroke, since the boosted oil in the piston side oil chamber 4A (the COMP chamber) is separated into two flow paths 7A and 3A bound for the oil reservoir chamber 6 and the rod side oil chamber 4B (the TEN chamber), the pressure in the rod side oil chamber 4B fluctuates between a positive pressure and a negative pressure on the basis of a balance of a flow path resistance or the like of the compression side damping valves 8A and 5A of the flow paths 7A and 3A. In other words, a pressure in the rod side oil chamber 4B fluctuates between the positive pressure and the negative pressure on the basis of the balance of the flow path resistance of the compression side damping valve 8A and the air pressure of the air chamber 6A, and the flow path resistance of the compression side damping valve 5A. If the flow path resistance of the compression side damping valve 5A is excessive, a cavitation is generated in the rod side oil chamber 4B and a pause of the damping force is generated at a time of an extension side reverse.

In this case, in an extension side stroke, the boosted oil in the rod side oil chamber 4B only flows out to the piston side oil chamber 4A from one flow path 3B, and the pressure in the piston side oil chamber 4A does not generate any fluctuation while depending only on the air pressure of the air chamber 6A.

An object of the present invention is to prevent pressure in a rod side oil chamber from being fluctuated by setting a flow path resistance of a compression side damping valve, in a compression side stroke in which an oil in a piston side oil chamber flows out to the rod side oil chamber and an oil reservoir chamber, thereby avoiding a pause of a damping force at a time of an extension side reverse, in the hydraulic shock absorber.

Another object of the present invention is to easily secure a flow path area between an oil chamber and an oil reservoir chamber of a cylinder so as to further securely avoid the pause of the damping force at a time of the extension side reverse, in the hydraulic shock absorber mentioned above.

Means for Solving the Problem

In accordance with claim 1 of the present invention, there is provided a hydraulic shock absorber comprising an oil chamber of a cylinder provided in a damper case which is attached to one of a vehicle body side and an axle side. A piston rod is attached to another of the vehicle body side and the axle side, the piston rod being inserted into the oil chamber. A piston is provided in a leading end portion of the piston rod. The oil chamber of the cylinder is being divided into a piston side oil chamber and a rod side oil chamber by the piston. An oil reservoir chamber compensates a volumetric capacity of the piston rod which goes to and out of the oil chamber of the cylinder, the oil reservoir chamber being communicated with the oil chamber of the cylinder. A damping force generating device is provided between the piston side oil chamber and the rod side oil chamber of the cylinder. An outer flow path communicates between the piston side oil chamber and the rod side oil chamber, the outer flow path being provided around the oil chamber of the cylinder in the damper case. The damping force generating device is provided with a compression side flow path which circulates an oil in the piston side oil chamber of the cylinder toward the rod side oil chamber via the outer flow path of the cylinder in a compression side stroke. The compression side flow path is provided with a compression side damping valve in its upstream side and with a compression side check valve in its downstream side, and an intermediate portion between the compression side damping valve and the compression side check valve which are provided in the compression side flow path being communicated with the oil reservoir chamber. The damping force generating device is provided with an extension side flow path which circulates an oil in the rod side oil chamber of the cylinder toward the piston side oil chamber via the outer flow path of the cylinder in an extension side stroke. The extension side flow path is provided with an extension side damping valve in its upstream side and an extension side check valve in its downstream side. An intermediate portion between the extension side damping valve and the extension side check valve which are provided in the extension side flow path are communicated with the oil reservoir chamber. The damping force generating device has first and second base pistons which are arranged at two positions aligned along an axial direction of the cylinder. The compression side damping valve and the extension side check valve are respectively provided in the compression side flow path and the extension side flow path which are provided in the first base piston. The extension side damping valve and the compression side check valve are respectively provided in the extension side flow path and the compression side flow path which are provided in the second base piston. At least one of the first base piston and the second base piston is provided with a communication path communicating the intermediate portion between the compression side damping valve and the compression side check valve which are provided in the respective compression side flow paths of the first and second base pistons with the oil reservoir chamber, and communicating the intermediate portion between the extension side damping valve and the extension side check valve which are provided in the respective extension side flow paths of the first and second base pistons with the oil reservoir chamber.

In accordance with claim 2 of the present invention, further in the invention in accordance with claim 1, wherein the oil reservoir chamber is provided in the periphery of the oil chamber of the cylinder and the outer flow path in the damper case.

In accordance with claim 3 of the present invention, further in the invention in accordance with claim 2, wherein the first and second base pistons are fixedly provided around a bolt, and the second base piston is immobilized to a bottom portion in one end side of the cylinder.

In accordance with claim 4 of the present invention, further in the invention in accordance with claim 2 or 3, wherein in the damper case, the cylinder is inserted and fitted to an inner portion of a damper tube, the cylinder consists of an outer tube and an inner tube, the oil chamber is formed in an inner portion of the inner tube, the outer flow path is formed between the outer tube and the inner tube, and the oil reservoir chamber is formed between the damper tube and the outer tube.

In accordance with claim 5 of the present invention, further in the invention in accordance with any one of claims 2 to 4, wherein the communication path is perforated from an intermediate portion between the extension side flow path to an outer peripheral portion facing to the oil reservoir chamber, in the first base piston.

In accordance with claim 6 of the present invention, further in the invention in accordance with any one of claims 2 to 4, wherein the communication path is perforated from an intermediate portion between the compression flow path to an outer peripheral portion facing to the oil reservoir chamber, in the second base piston.

In accordance with claim 7 of the present invention, further in the invention in accordance with claim 1, wherein the oil reservoir chamber is provided in an upper portion of the oil chamber of the cylinder in the damper case.

In accordance with claim 8 of the present invention, further in the invention in accordance with claim 7, wherein the first and second base pistons are fixedly provided around the bolt, and the first and second base pistons are immobilized to an upper end side of the cylinder.

In accordance with claim 9 of the present invention, further in the invention in accordance with claim 8, wherein the cylinder provided in the damper case consists of an outer tube and an inner tube. The oil chamber is formed in an inner portion of the inner tube, the outer flow path is formed between the outer tube and the inner tube, and the oil reservoir chamber is formed in an inner portion of the outer tube which is above the second base piston.

In accordance with claim 10 of the present invention, further in the invention in accordance with claim 9, wherein the communication path is perforated from an intermediate portion of the compression side flow path to an outer peripheral portion facing to the oil reservoir chamber, in the second base piston.

In accordance with claim 11 of the present invention, further in the invention in accordance with any one of claims 1 to 10, wherein the damping force generating device is accessorily provided with a compression side damping force generating means in the compression side check valve which is provided in a downstream side of the compression side flow path.

In accordance with claim 12 of the present invention, further in the invention in accordance with any one of claims 1 to 11, wherein the damping force generating device is accessorily provided with an extension side damping force generating means in the extension side check valve which is provided in a downstream side of the extension side flow path.

Effects (Claim 1)

(a) In a hydraulic shock absorber, a damping force generating device is provided between a piston side oil chamber of a cylinder and a rod side oil chamber. The damping force generating device is provided with the compression side flow path which circulates the oil in the piston side oil chamber of the cylinder toward the rod side oil chamber via the outer flow path of the cylinder in the compression side stroke. The compression side flow path is provided with a compression side damping valve in its upstream side and with a compression side check valve in its downstream side. The intermediate portion between the compression side damping valve and the compression side check valve which are provided in the compression side flow path is communicated with an oil reservoir chamber. The damping force generating device is provided with an extension side flow path which circulates the oil in the rod side oil chamber of the cylinder toward the piston side oil chamber via the outer flow path of the cylinder in the extension side stroke. The extension side flow path is provided with an extension side damping valve in its upstream side and with an extension side check valve in its downstream side, and the intermediate portion between the extension side damping valve and the extension side check valve which are provided in the extension side flow path is communicated with the oil reservoir chamber.

In the compression side stroke, the boosted oil in the piston side oil chamber passes through the compression side damping valve in the upstream side of the compression side flow path of the damping force generating device so as to generate the compression side damping force. One oil flow in the oil flowing out of the compression side damping valve flows into the rod side oil chamber from the compression side check valve through the outer flow path of the cylinder. Further, the oil flow at an inserting volume of the piston rod which corresponds to another oil flow in the oil flowing out of the compression side damping valve flows into the oil reservoir chamber. At this time, the pressure in the rod side oil chamber approximately depends only on the pressure of the air chamber which pressurizes the oil reservoir chamber (since the flow path resistance between the compression side check valve in the downstream side of the compression side damping valve and the outer flow path of the cylinder is small), and does not fluctuate by setting the flow path resistance of the compression side damping valve. Accordingly, it is possible to avoid a pause of the damping force during the extension side reverse.

In the extension side stroke, the boosted oil in the rod side oil chamber passes through the extension side damping valve in the upstream side of the extension side flow paths of the damping force generating device via the outer flow path of the cylinder so as to generate the extension side damping force. The oil flowing out of the extension side damping valve is mixed with the oil at the going-out volume of the piston rod which is replenished from the oil reservoir chamber, and thereafter flows into the piston side oil chamber through the extension side check valve.

In this case, it is possible to set the pressure in the rod side oil chamber to the relatively high positive pressure in the compression side stroke so as to improve damping response at a time of the extension side reverse, by setting the pressure in the air chamber pressurizing the oil reservoir chamber to the high pressure.

(b) At least one of a first base piston and a second base piston is provided with the communication path communicating the intermediate portion between the compression side damping valve and the compression side check valve which are provided in the respective compression side flow paths of the first and second base pistons with the oil reservoir chamber, and communicating the intermediate portion between the extension side damping valve and the extension side check valve which are provided in the respective extension side flow paths of the first and second base pistons with the oil reservoir chamber. In accordance with this, it is possible to form the flow path of the oil in the item (a) mentioned above which flows out to the oil reservoir chamber from the piston side oil chamber through the damping force generating device in the compression side stroke, and the flow path of the oil in the item (a) mentioned above which flows out to the piston side oil chamber from the oil reservoir chamber through the damping force generating device in the extension side stroke, by the communication path which is provided in at least one of the first base piston and the second base piston. Since the communication path may in one embodiment be a flow path such as a transverse hole or the like, it is more simple to secure the flow path area between the oil chamber and the oil reservoir chamber of the cylinder, and smoothly apply the pressure in the air chamber to the rod side oil chamber. It is possible to further securely avoid the pause of the damping force at a time of the extension side reverse. Further, the communication path can set its flow path length short and set its flow path resistance small, and it is possible to improve freedom of setting. Further, the communication path can be formed only by being perforated in at least one of the first base piston and the second base piston, and it is possible to reduce cost without increasing the number of parts.

(Claim 2)

(c) In the hydraulic shock absorber, the outer flow path communicating the piston side oil chamber and the rod side oil chamber is provided in the periphery of the oil chamber of the cylinder in the damper case, and the oil reservoir chamber is provided in the periphery of the oil chamber and the outer flow path of the cylinder in the damper case. Accordingly, it is structured such that the oil chamber is provided in the center portion of the cylinder in the damper case, the outer flow path is provided in the outer side of the oil chamber, and the oil reservoir chamber is provided further in the outer side of the outer flow path. In accordance with this, in the hydraulic shock absorber, the oil chamber of the cylinder, the outer flow path and the oil reservoir chamber can be additionally provided in the inner portion of the damper case having a short whole length, without enlarging a dimension of the damper case, and it is possible to improve freedom of the layout in the vehicle to which this is mounted.

(Claim 3)

(d) The first and second base pistons are fixedly provided around the bolt, and the second base piston is immobilized to the bottom portion in the one end side of the cylinder. Accordingly, it is possible to easily assemble the first and second base pistons and at two positions along the axial direction of the cylinder.

(Claim 4)

(e) The damper case inserts and fits the cylinder to the inner portion of the damper tube. The cylinder consists of the outer tube and the inner tube. The oil chamber is formed in the inner portion of the inner tube, the outer flow path is formed between the outer tube and the inner tube, and the oil reservoir chamber is formed between the damper tube and the outer tube. On the basis of a triple tube structure consisting of the damper tube, and the outer tube and the inner tube of the cylinder, it is possible to compactly realize the item (c) mentioned above.

(Claim 5)

(f) The communication path is perforated from the intermediate portion of the extension side flow path to the outer peripheral portion facing to the oil reservoir chamber, in the first base piston. In accordance with this, it is possible to simply form the communication path in the item (b) mentioned above by the simple transverse hole which is provided in the first base piston.

(Claim 6)

(g) The communication path is perforated from the intermediate portion of the compression side flow path to the outer peripheral portion facing to the oil reservoir chamber, in the second base piston. In accordance with this, it is possible to simply form the communication path in the item (b) mentioned above by the simple transverse hole which is provided in the second base piston.

(Claim 7)

(h) In the hydraulic shock absorber, the oil reservoir chamber is provided in the upper portion of the oil chamber of the cylinder in the damper case. In accordance with this, the oil reservoir chamber can be provided in the upper portion of the oil chamber of the cylinder in the damper case without enlarging the diameter of the damper case, in the hydraulic shock absorber, and it is possible to improve freedom of the layout in the vehicle to which this is mounted.

(Claim 8)

(i) The first and second base pistons are fixedly provided around the bolt, and the first and second base pistons are immobilized to the upper end side of the cylinder. Accordingly, it is possible to easily assemble the first and second base pistons at two positions which are along the axial direction of the cylinder.

(Claim 9)

(j) The cylinder provided in the damper case consists of the outer tube and the inner tube, the oil chamber is formed in the inner portion of the inner tube, the outer flow path is formed between the outer tube and the inner tube, and the oil reservoir chamber is formed in the inner portion of the outer tube above the second base piston. On the basis of the double tube structure consisting of the outer tube and the inner tube of the cylinder, it is possible to realize the item (h) mentioned above compactly.

(Claim 10)

(k) The communication path is perforated from the intermediate portion of the compression side flow path to the outer peripheral portion facing to the oil reservoir chamber, in the second base piston. On the basis of the simple transverse hole provided in the second base piston, it is possible to easily form the communication path in the item (b) mentioned above.

(Claim 11)

(l) The damping force generating device is accessorily provided with a compression side damping force generating means in the compression side check valve provided in the downstream side of the compression side flow path, and the compression side check valve is constructed, for example, by the compression side laminated disc valve. At this time, in the compression side stroke, one oil flow in the oil flowing out of the compression side damping valve in the upstream side flows into the rod side oil chamber from the compression side laminated disc valve through the outer flow path of the cylinder, however, the compression side laminated disc valve achieves the compression side damping force generating function as well as the check function. The compression side laminated disc valve generates a damping force $\Delta F$ which depends on the piston speed, and a pressure Pr in the rod side oil chamber comes to a value obtained by subtracting $\Delta F$ from a pressure Pa in the air chamber pressurizing the oil reservoir chamber, that is, a value which is controlled while depending on the piston speed.

The pressure Pr of the rod side oil chamber being controlled while depending on the piston speed in the compression side stroke as mentioned above means that it is possible to control a rising characteristic of the damping force at a time of the extension side reverse while depending on the piston speed. When the piston speed is high, $\Delta F$ becomes larger by a throttling of the compression side laminated disc valve, and Pr becomes smaller. Accordingly, the rising edge of the damping force at a time of the extension side reverse becomes slow so as to improve a ride quality. When the piston speed is low, $\Delta F$ by the throttling of the compression side laminated disc valve becomes smaller, and Pr becomes larger. Accordingly, the rising edge of the damping force at a time of the extension side reverse becomes sharp so as to suppress a wobbling feeling of the vehicle body and improve a driving stability.

At this time, a total amount of the compression side damping force comes to a summation of the damping force of the compression side damping valve and the damping force of the compression side laminated disc valve, however, the damping force of the compression side damping valve is made larger in a normal setting. The total amount of the compression side damping force approximately depends on the damping force of the compression side damping valve.

(Claim 12)

(m) The damping force generating device is accessorily provided with the extension side damping force generating means in the extension side check valve provided in the downstream side of the extension side flow path, and the extension side check valve is constructed, for example, by the extension side laminated disc valve. At this time, in the extension side stroke, one oil flow in the oil flowing out of the extension side damping valve in the upstream side flows into the piston side oil chamber from the extension side laminated disc valve through the outer flow path of the cylinder, however, the extension side laminated disc valve achieves the extension side damping force generating function as well as the check function. The extension side laminated disc valve generates the damping force $\Delta F$ which depends on the piston speed, and a pressure Pp in the piston side oil chamber comes to a value obtained by subtracting $\Delta F$ from the pressure Pa in the air chamber pressurizing the oil reservoir chamber, that is, a value which is controlled while depending on the piston speed.

The pressure Pp of the piston side oil chamber being controlled while depending on the piston speed in the extension side stroke as mentioned above means that it is possible to control a rising characteristic of the damping force at a time of the compression side reverse while depending on the piston speed. When the piston speed is high, $\Delta F$ becomes larger by a throttling of the extension side laminated disc valve, and Pp becomes smaller. Accordingly, the rising edge of the damping force at a time of the compression side reverse becomes slow so as to improve a ride quality. When the piston speed is low, $\Delta F$ by the throttling of the extension side laminated disc valve becomes smaller, and Pp becomes larger. Accordingly, the rising edge of the damping force at a time of the compression side reverse becomes sharp so as to suppress a wobbling feeling of the vehicle body and improve a driving stability.

At this time, a total amount of the extension side damping force resulting from a summation of the damping force of the extension side damping valve and the damping force of the extension side laminated disc valve, however, the damping force of the extension side damping valve is made larger in a normal setting. The total amount of the extension side damping force approximately depends on the damping force of the extension side damping valve.

BRIEF DESCRIPTION OF THE DRAWINGS

FIGS. 4(A) and 4(B) are cross sectional views showing a flow of an oil in the damping force generating device, wherein FIG. 4(A) shows a compression side stroke, and FIG. 4(B) shows an extension side stroke.

FIGS. 5(A), 5(B) and 5(C) show a second base piston (an extension side piston), wherein FIG. 5(A) is a plan view, FIG. 5(B) is a cross sectional view and FIG. 5(C) is a bottom elevational view.

FIGS. 10(A) and 10(B) are cross sectional views showing a flow of an oil in the damping force generating device, wherein FIG. 10(A) shows a compression side stroke, and FIG. 10(B) shows an extension side stroke.

FIGS. 14(A) and 14(B) are cross sectional views showing a flow of an oil in the damping force generating device, wherein FIG. 14(A) shows a compression side stroke, and FIG. 14(B) shows an extension side stroke.

BEST MODE FOR CARRYING OUT THE INVENTION

Embodiment 1

FIGS. 1 to 6

Figure 1:
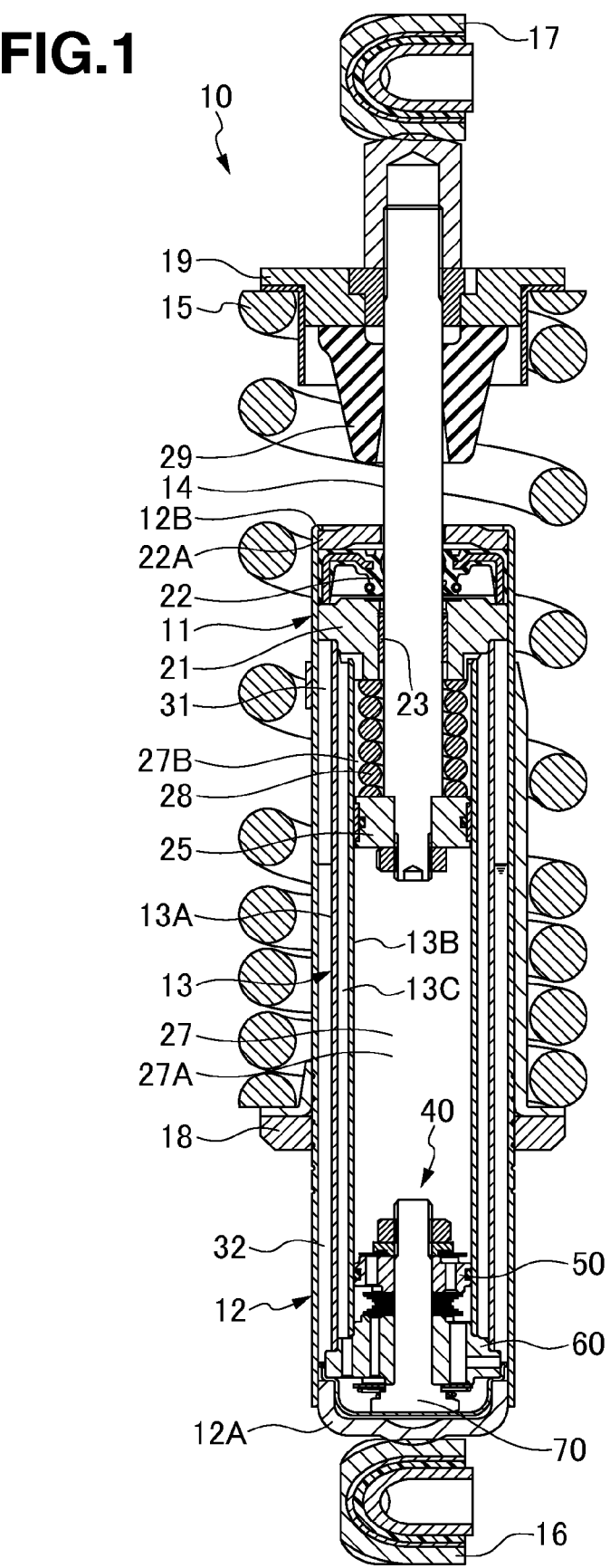
FIG. 1 is a whole cross sectional view showing a hydraulic shock absorber in accordance with an embodiment 1.
Figure 2:
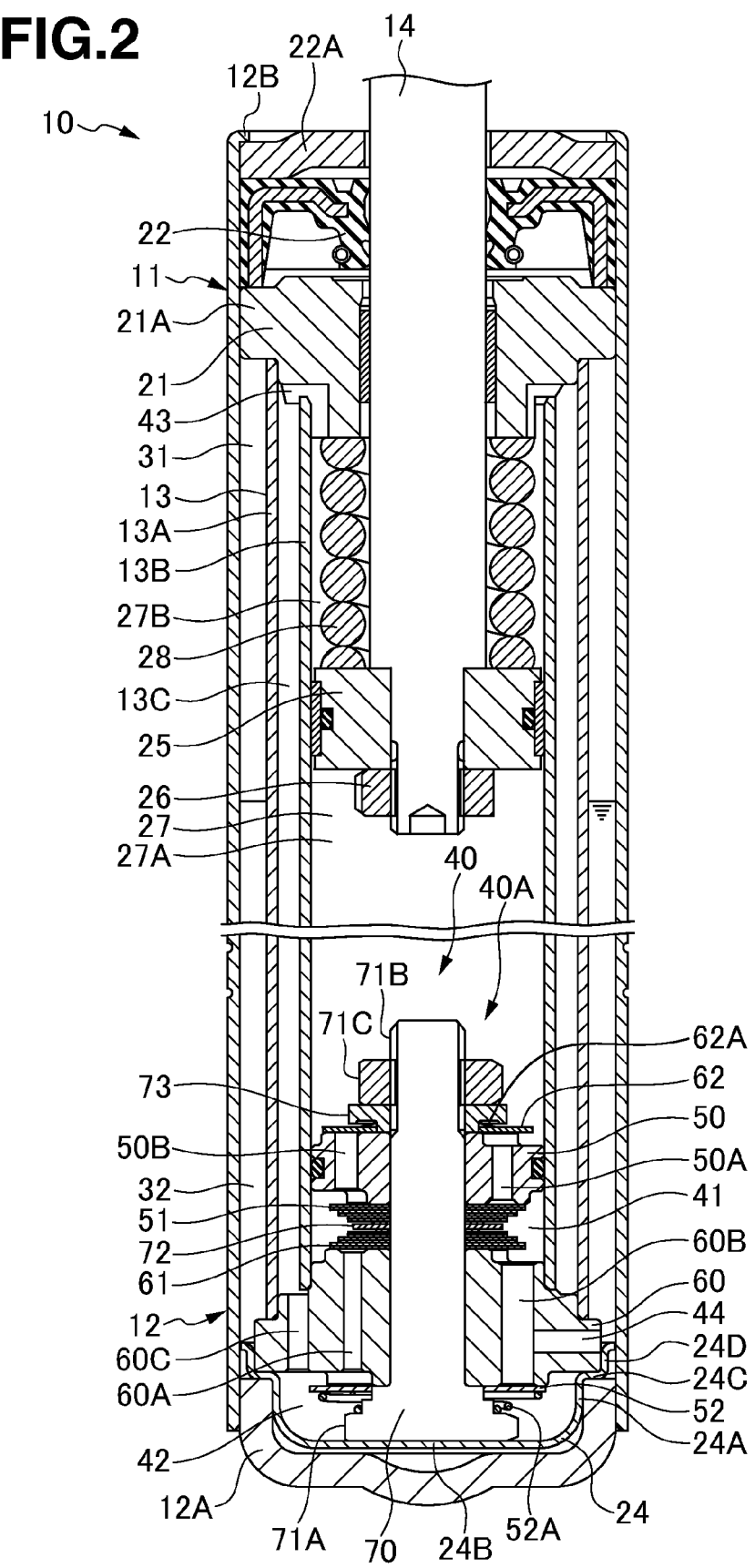
FIG. 2 is a cross sectional view of a substantial part in FIG. 1.
Figure 3:
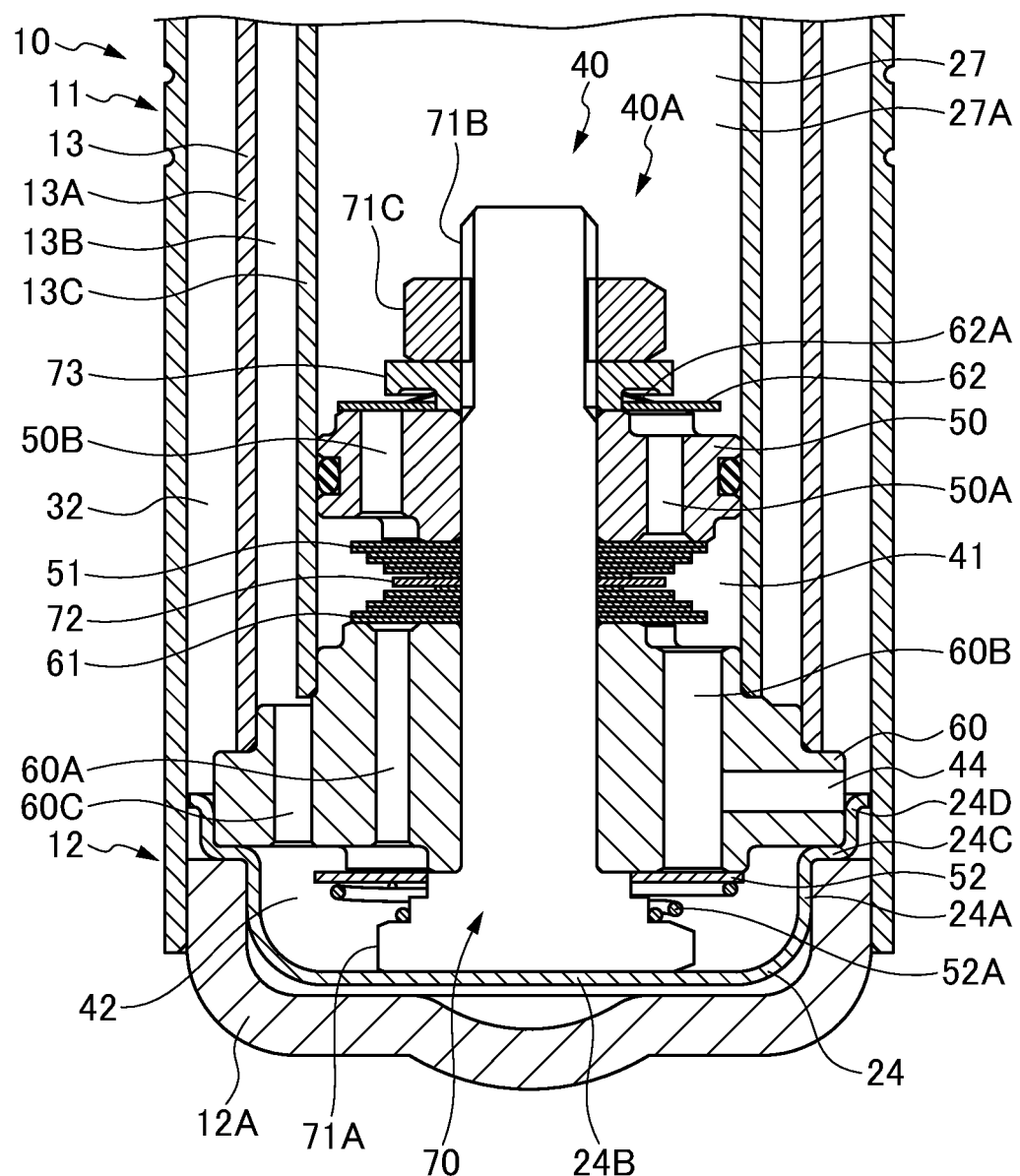
FIG. 3 is a cross sectional view showing a damping force generating device.
Figure 4:
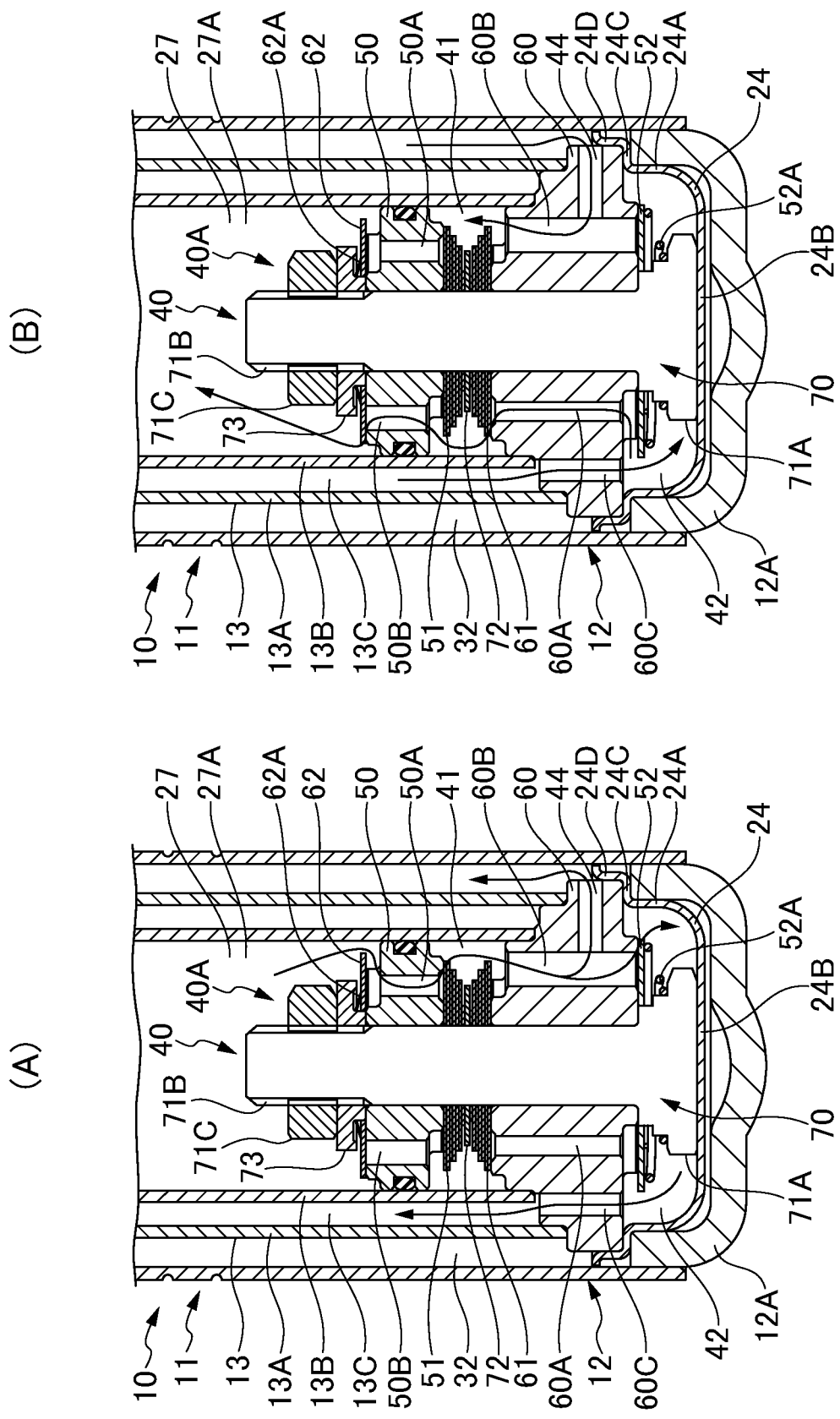

A hydraulic shock absorber 10 is structured, as shown in FIGS. 1 to 3 and 6, such that a damper case 11 attached to an axle side has a damper tube 12, and a damper cylinder 13 is inserted and fitted into an inner portion of the damper tube 12. Further, the hydraulic shock absorber 10 is structured such that a piston rod 14 attached to a vehicle body side is slidably inserted into center portions of the damper tube 12 of the damper case 11 and the cylinder 13, and a suspension spring 15 is interposed to outer portions of the damper case 11 and the piston rod 14.

The damper case 11 is provided with an axle side attaching member 16 in a center portion of an outer surface of a bottom cap 12A of the damper tube 12, and the piston rod 14 is provided with a vehicle body side attaching member 17. A spring receiver 18 is provided in an outer peripheral portion of the damper tube 12 in the damper case 11, and a spring receiver 19 is provided in an outer peripheral portion of the vehicle body side attaching member 17 in the piston rod 14. The suspension spring 15 is interposed between the spring receiver 18 and the spring receiver 19, and absorbs a shock force which a vehicle receives from a road surface on the basis of a spring force of the suspension spring 15.

The damper tube 12 of the damper case 11 is provided in its opening portion with a rod guide 21 through which the piston rod 14 passes. The rod guide 21 is structured such that a large outer diameter portion of a head portion 21A is inserted into and attached in a liquid tight manner to the damper tube 12, and the piston rod 14 is slidably inserted in a liquid tight manner into an inner diameter portion provided with an oil seal 22 and a bush 23.

In the hydraulic shock absorber 10, the damper case 11 is structured such that the cylinder 13 is inserted and fitted into the inner portion of the damper tube 12. The cylinder 13 consists of an outer tube 13A and an inner tube 13B. The damper case 11 is fixed by welding or the like by fitting a lower end inner periphery of the damper tube 12 to an outer periphery of a cup-shaped bottom cap 12A.

An outer periphery of a body portion 24A of a cup-shaped bottom plate 24 made of a steel plate press is clearance fitted to an inner periphery of the cup of the bottom cap 12A so as to be centering arranged (a bottom portion 24B of the bottom plate 24 interposes a fixed gap with respect to a bottom surface of the cup of the bottom cap 12A). A large outer diameter portion in an outer periphery of a second base piston 60 mentioned below is pressed into an inner periphery of a fitting tube portion 24D which rises up from an outer periphery of a flange 24C of the bottom plate 24 mounted on an upper end surface of the cup of the bottom cap 12A so as to be centering arranged. A lower end surface of the second base piston 60 is mounted on an upper surface of the flange 24C of the bottom plate 24. Further, respective lower end inner peripheries of the outer tube 13A and the inner tube 13B of the cylinder 13 are pressed into a middle outer diameter portion and a small outer diameter portion of the outer periphery of the second base piston 60 so as to be fixed.

On the other hand, respective upper end inner peripheries of the outer tube 13A and the inner tube 13B of the cylinder 13 are fixed by press fitting to a middle outer diameter portion and a small outer diameter portion which are provided below the head portion 21A of the rod guide 21. Further, the damper tube 12 is inserted and attached by the head portion 21A of the rod guide 21, protrudes above an oil seal 22 on the head portion 21A and a washer 22A provided on an upper surface of the oil seal 22, and has a protruding end as a caulking portion 12B. The damper tube 12 is structured such that the outer tube 13A and the inner tube 13B of the cylinder 13 are pinched and fixed in an axial direction between the bottom cap 12A and the caulking portion 12B via the rod guide 21, the oil seal 22, the washer 22A, the bottom plate 24 and the second base piston 60.

In the hydraulic shock absorber 10, in accordance with the above, a whole of the damper case 11 is formed as a triple tube in which the damper tube 12, and the outer tube 13A and the inner tube 13B of the cylinder 13 are coaxially arranged. Further, an oil chamber 27 consisting of a piston side oil chamber 27A and a rod side oil chamber 27B is formed in an inner portion of the inner tube 13B. An outer flow path 13C communicating the piston side oil chamber 27A and the rod side oil chamber 27B is formed by an annular gap between the outer tube 13A and the inner tube 13B, and an annular gap between the damper tube 12 and the outer tube 13A is formed as an air chamber 31 and an oil reservoir chamber 32. An upper space of the oil reservoir chamber 32 becomes the air chamber 31.

In other words, in the hydraulic shock absorber 10, when the piston rod 14 is inserted into the center portions of the damper tube 12 of the damper case 11 and the cylinder 13, a piston 25 inserted into and attached to a leading end portion of the piston rod 14 is fixed by a nut 26, and the oil chamber 27 of the cylinder 13 is divided into the piston side oil chamber 27A and the rod side oil chamber 27B by the piston 25 which is slidably inserted into an inner periphery of the inner tube 13B. Reference numeral 28 denotes a rebound spring, and reference numeral 29 denotes a bump rubber.

Further, in the hydraulic shock absorber 10, the air chamber 31 and the oil reservoir chamber 32 are respectively provided in upper and lower sides of an annular gap between the damper tube 12 and the outer tube 13A. The oil reservoir chamber 32 is provided in such a manner as to be communicated with the oil chamber 27 of the cylinder 13, and the oil reservoir chamber 32 compensates a volumetric capacity (including a volumetric capacity of a temperature expanding amount of the oil) of the piston rod 14 which goes to and out of the oil chamber 27 of the cylinder 13.

The hydraulic shock absorber 10 is provided with a damping force generating device 40 between the piston side oil chamber 27A and the rod side oil chamber 27B of the cylinder 13.

The damping force generating device 40 has first and second base pistons 50 and 60 which are arranged at two positions aligned along the axial direction of the cylinder 13.

The damping force generating device 40 is inserted into and attached to a lower end inner periphery of each of the outer tube 13A and the inner tube 13B of the cylinder 13 so as to be embedded, in a state of a valve unit 40A in which the first and second base pistons 50 and 60 are fixedly provided around a bolt 70.

The valve unit 40A of the damping force generating device 40 has a compression side check valve 52 (a valve spring 52A), the second base piston 60, an extension side damping valve 61, a valve stopper 72, a compression side damping valve 51, the first base piston 50, an extension side check valve 62 (a valve spring 62A), and a valve stopper 73. The elements of the structure are loaded in a skewering manner to an outer periphery of a rod-like thread portion 71B one by one from a side of a head portion 71A of the bolt 70, and immobilized by a nut 71C which is attached by screw to the rod-like thread portion 71B.

The valve unit 40A of the damping force generating device 40 is structured such that the large outer diameter portion of the outer periphery of the second base piston 60 is assembled as mentioned above with respect to the flange 24C and the fitting tube portion 24D of the bottom plate 24 which is clearance fitted to the bottom cap 12A. The respective lower end inner peripheries of the outer tube 13A and the inner tube 13B of the cylinder 13 are assembled as mentioned above with respect to the middle outer diameter portion and the small outer diameter portion of the outer periphery of the second base piston 60. The first base piston 50 is inserted into and attached in a liquid tight manner to the inner periphery of the inner tube 13B of the cylinder 13 via an O-ring which is provided in an outer periphery. In accordance with this, the second base piston 60 of the valve unit 40A is immobilized to the bottom portion in one end side of the cylinder 13, and the first base piston 50 of the valve unit 40A is immobilized to the inner periphery of the cylinder 13.

The damping force generating device 40 sets an annular space which is pinched by the first base piston 50 and the second base piston 60 in the inner portion of the inner tube 13B to an extension and compression common flow path 41. An upper space of the first base piston 50 in the inner portion of the inner tube 13B is set to the piston side oil chamber 27A. A lower space of the second base piston 60 in the inner portion of the inner tube 13B is set to an extension and compression common flow path 42 which is communicated with the rod side oil chamber 27B via a hole-like flow path 60C perforated in the second base piston 60, and the outer flow path 13C between the outer tube 13A and the inner tube 13B of the cylinder 13. An extension and compression common flow path 43 which communicates the rod side oil chamber 27B with the outer flow path 13C is formed in a notched manner in an upper end side of the inner tube 13B, a small outer diameter portion of the rod guide 21 in the present embodiment.

The damping force generating device 40 is provided in the first base piston 50 with a compression side flow path 50A which is opened and closed by the compression side damping valve 51, and an extension side flow path 50B which is opened and closed by the extension side check valve 62. Further, it is provided in the second base piston 60 with a compression side flow path 60B which is opened and closed by the compression side check valve 52, and an extension side flow path 60A which is opened and closed by the extension side damping valve 61. The damping force generating device 40 communicates the piston side oil chamber 27A and the rod side oil chamber 27B of the cylinder 13 via the extension and compression common flow paths 41, 42 and 43, the compression side flow path 50A and the extension side flow path 50B which are provided in the first base piston 50, the compression side flow path 60B, the extension side flow path 60A and the hole-like flow path 60C which are provided in the second base piston 60, and the outer flow path 13C which is provided in an annular gap of the outer tube 13A and the inner tube 13B of the cylinder 13. (The piston 25 is not provided with a flow path which communicates the piston side oil chamber 27A and the rod side oil chamber 27B).

The damping force generating device 40 is provided in the second base piston 60 with a communication path 44 which communicates an intermediate portion between the compression side damping valve 51 and the compression side check valve 52 which are provided in the respective compression side flow paths 50A and 60B of the first base piston 50 and the second base piston 60 (a portion communicating with the extension and compression common flow path 41) with the oil reservoir chamber 32. This communication path 44 also communicates an intermediate portion between the extension side damping valve 61 and the extension side check valve 62 which are provided in the respective extension side flow paths 50B and 60A of the first base piston 50 and the second base piston 60 (a portion communicating with the extension and compression common flow path 41) with the oil reservoir chamber 32.

Figure 5:
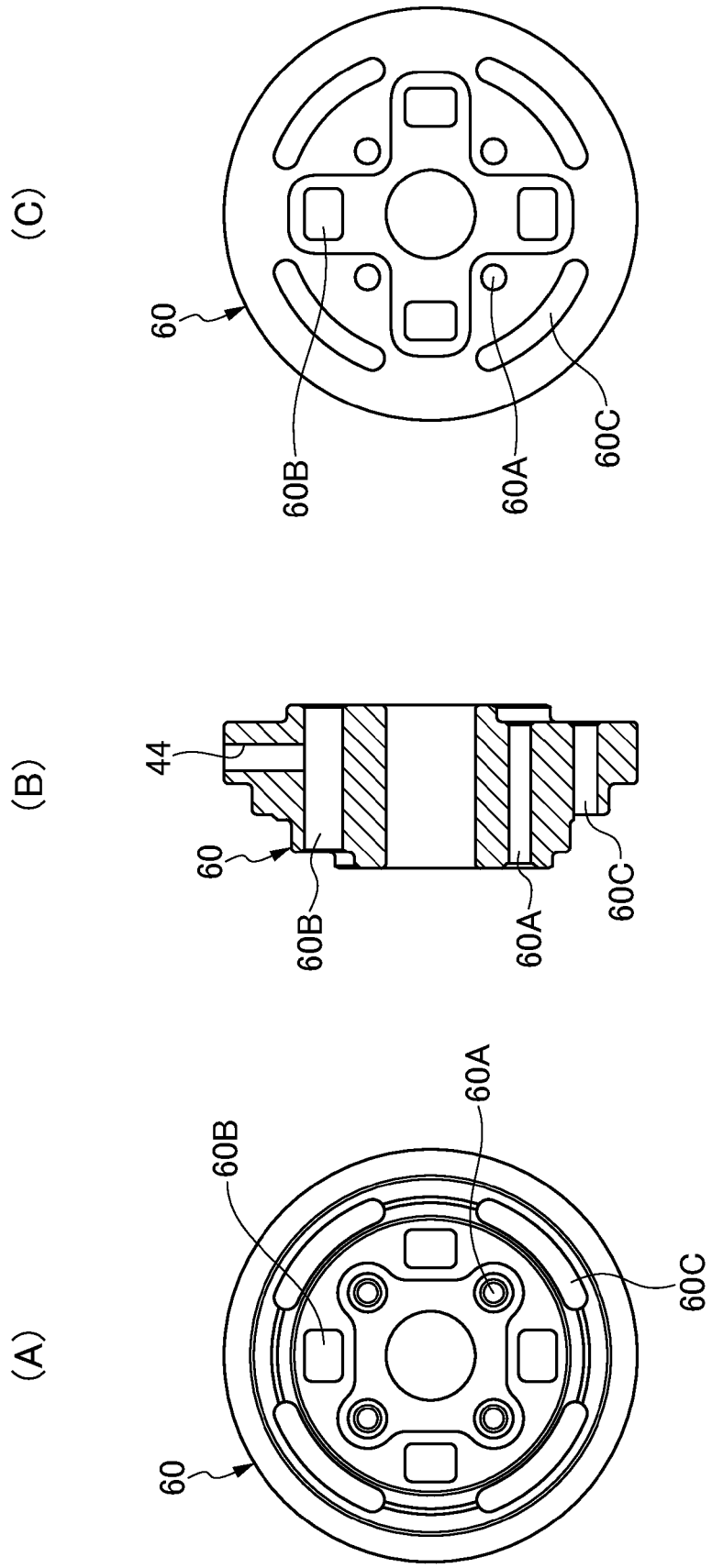
Figure 6:
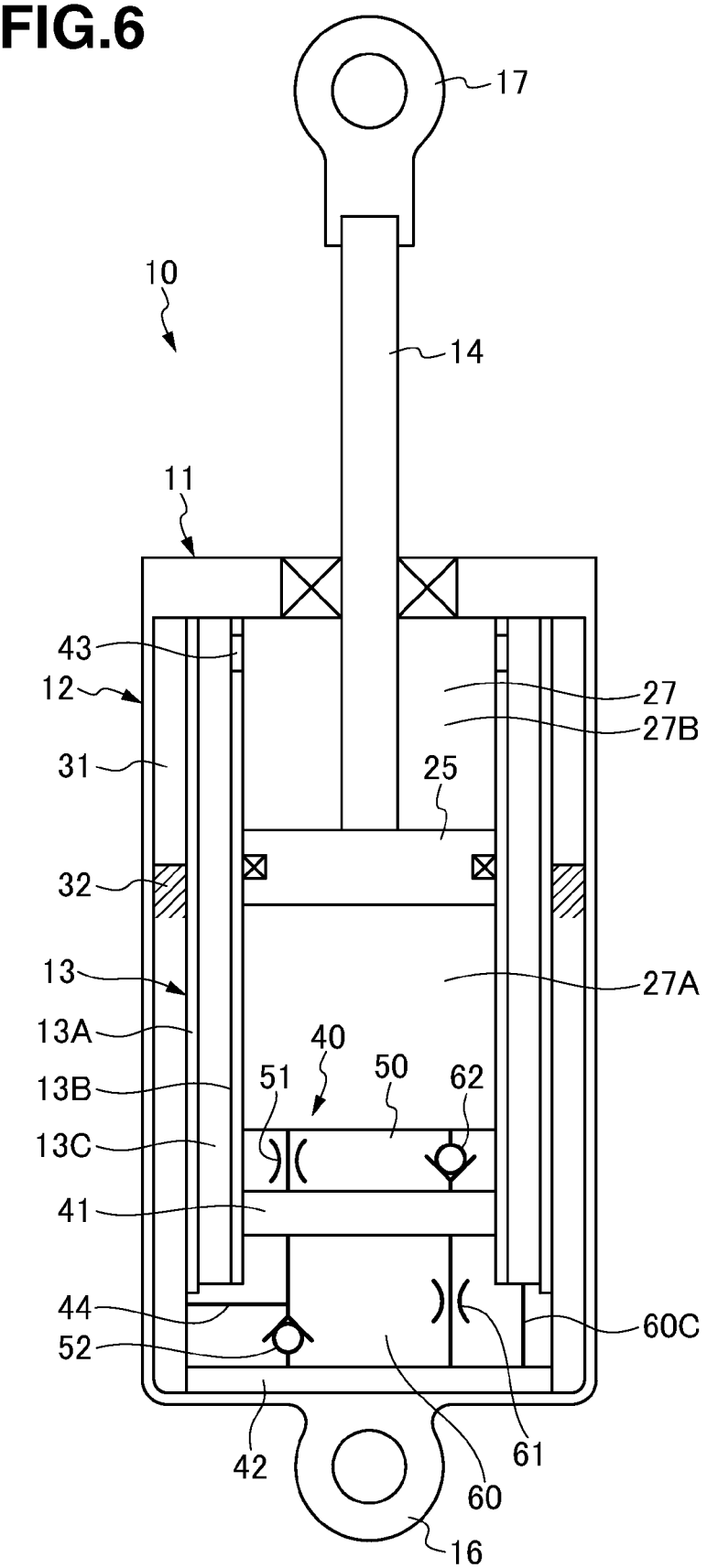
FIG. 6 is a schematic cross sectional view showing a basis structure of the hydraulic shock absorber.
Figure 7:
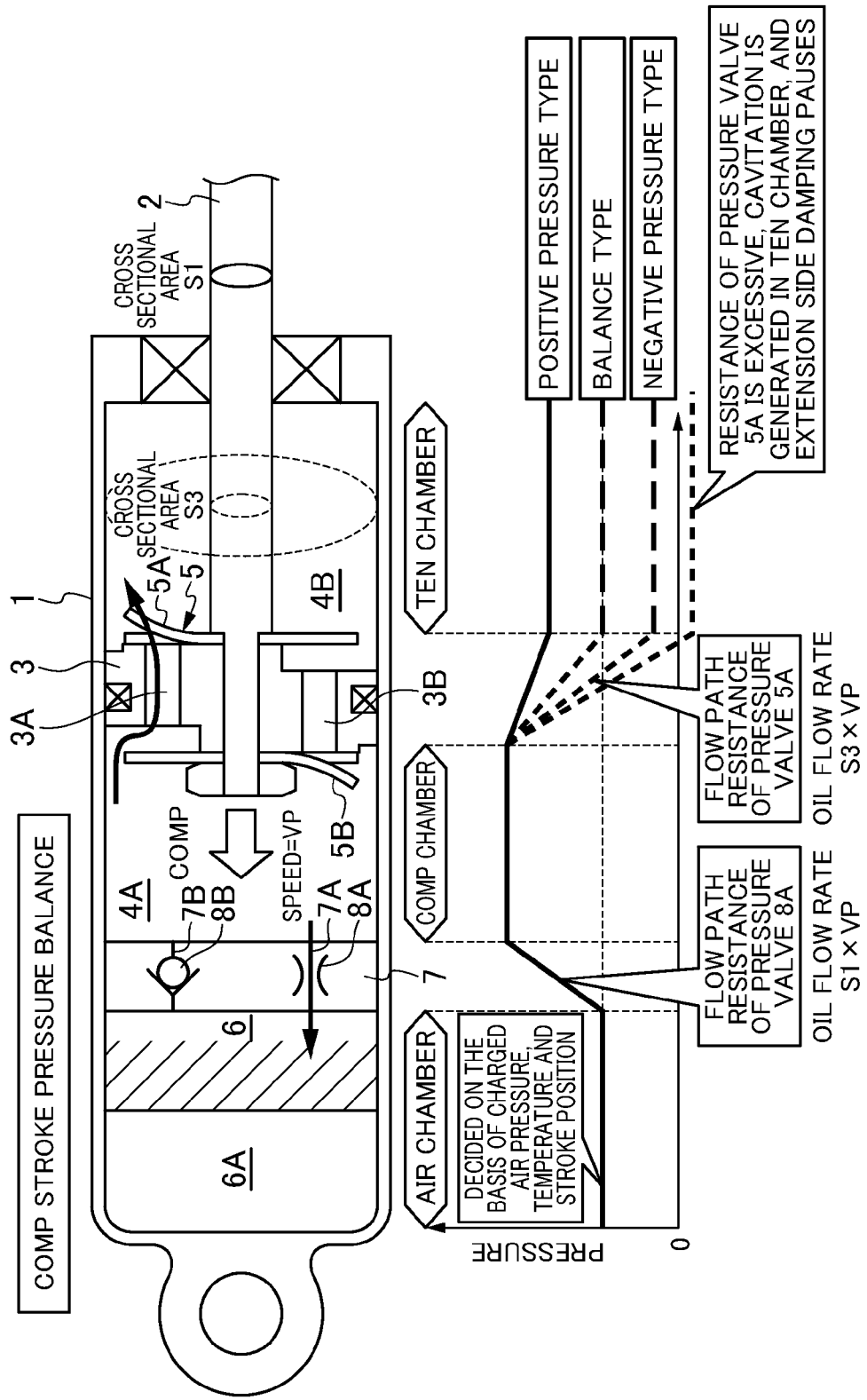
FIG. 7 is a schematic cross sectional view showing a prior art.

The second base piston 60 makes a part of an outer periphery of a large outer diameter portion which is pressed into the fitting tube portion 24D of the bottom plate 24 face to the oil reservoir chamber 32, at a time of being assembled in the damper tube 12 of the damper case 11 and the cylinder 13 as mentioned above. Further, the second base piston 60 is perforated with a transverse hole which runs into the intermediate portion of the compression side flow path 60B from a part of the outer periphery mentioned above of the large outer diameter portion toward a radial direction, as shown in FIG. 5, and sets the transverse hole to the communication path 44.

Accordingly, in the damping force generating device 40 of the hydraulic shock absorber 10, it is structured such as to use the compression side flow paths (the extension and compression common flow paths 41, 42 and 43, the compression side flow paths 50A and 60B and the hole-like flow path 60C) which circulate the oil in the piston side oil chamber 27A of the cylinder 13 via the outer flow path 13C of the cylinder 13 toward the rod side oil chamber 27B, in the compression side stroke. The device is provided with the compression side damping valve 51 in an upstream side and the compression side check valve 52 in a downstream side of the compression side flow paths (the extension and compression common flow paths 41, 42 and 43, the compression side flow paths 50A and 60B and the hole-like flow path 60C) so as to communicate an intermediate portion between the compression side damping valve 51 and the compression side check valve 52 in the compression side flow paths (the extension and compression common flow paths 41, 42 and 43, the compression side flow paths 50A and 60B and the hole-like flow path 60C) with the oil reservoir chamber 32 via the communication path 44.

Further, it is structured such as to use the extension side flow paths (the extension and compression common flow paths 41, 42 and 43, the extension side flow paths 50B and 60A and the hole-like flow path 60C) which circulate the oil in the rod side oil chamber 27B of the cylinder 13 via the outer flow path 13C of the cylinder 13 toward the piston side oil chamber 27A, in the extension side stroke. The device is provided with the extension side damping valve 61 in an upstream side and the extension side check valve 62 in a downstream side of the extension side flow paths (the extension and compression common flow paths 41, 42 and 43, the extension side flow paths 50B and 60A and the hole-like flow path 60C), so as to communicate an intermediate portion between the extension side damping valve 61 and the extension side check valve 62 in the extension side flow paths (the extension and compression common flow paths 41, 42 and 43, the extension side flow paths 50B and 60A and the hole-like flow path 60C) with the oil reservoir chamber 32 via the communication path 44.

Accordingly, the hydraulic shock absorber 10 carries out a damping action in the following manner.

(Compression Side Stroke) (Flow of Solid Arrow in FIG. 4(A))

The oil in the piston side oil chamber 27A is boosted, and pushes open the compression side damping valve 51 in the compression side flow path 50A of the first base piston 50 of the damping force generating device 40 so as to generate the compression side damping force. The oil flowing out of the compression side damping valve 51 to the extension and compression common flow path 41 is separated into two in the compression side flow path 60B of the second base piston 60. One portion of oil flows out to the rod side oil chamber 27B from the compression side check valve 52 in the compression side flow path 60B of the second base piston 60 through the extension and compression common flow path 42, the hole-like flow path 60C of the second base piston 60, the outer flow path 13C of the cylinder 13 and the extension and compression common flow path 43. Another portion of oil is discharged to the oil reservoir chamber 32 from the communication path 44 of the second base piston 60. Another portion of oil discharged to the oil reservoir chamber 32 compensates the oil at an inserting volume of the piston rod 14.

(Extension Side Stroke) (Flow of Solid Arrow in FIG. 4(B))

The oil in the rod side oil chamber 27B is boosted, flows into the hole-like flow path 60C of the second base piston 60 of the damping force generating device 40 and the extension and compression common flow path 42 through the extension and compression common flow path 43 and the outer flow path 13C of the cylinder 13, and pushes open the extension side damping valve 61 in the extension side flow path 60A of the second base piston 60 so as to generate the extension side damping force. The oil flowing out of the extension side damping valve 61 to the extension and compression common flow path 41 is mixed with the oil which is replenished from the oil reservoir chamber 32 via the communication path 44 of the second base piston 60 and the compression side flow path 60B, and thereafter flows out to the piston side oil chamber 27A through the extension side check valve 62 in the extension side flow path 50B of the first base piston 50. The oil replenished from the oil reservoir chamber 32 compensates the oil at the going-out volume of the piston rod 14.

Therefore, in accordance with the present embodiment, the following operation and effect can be achieved.

(a) In the damping force generating device 40 of the hydraulic shock absorber 10, the damping force generating device 40 is provided between the piston side oil chamber 27A of the cylinder 13, and the rod side oil chamber 27B. It is structured such as to use the compression side flow paths (the extension and compression common flow paths 41, 42 and 43, the compression side flow paths 50A and 60B and the hole-like flow path 60C) which circulate the oil in the piston side oil chamber 27A of the cylinder 13 toward the rod side oil chamber 27B via the outer flow path 13C of the cylinder 13 in the compression side stroke. The structure includes the compression side damping valve 51 in the upstream side and the compression side check valve 52 in the downstream side of the compression side flow paths (the extension and compression common flow paths 41, 42 and 43, the compression side flow paths 50A and 60B and the hole-like flow path 60C). so as to communicate the intermediate portion between the compression side damping valve 51 and the compression side check valve 52 in the compression side flow paths (the extension and compression common flow paths 41, 42 and 43, the compression side flow paths 50A and 60B and the hole-like flow path 60C) with the oil reservoir chamber 32 via the communication path 44. The extension side flow paths (the extension and compression common flow paths 41, 42 and 43, the extension side flow paths 50B and 60A and the hole-like flow path 60C) circulate the oil in the rod side oil chamber 27B of the cylinder 13 toward the piston side oil chamber 27A via the outer flow path 13C of the cylinder 13 in the extension side stroke. The structure includes the extension side damping valve 61 in the upstream side and the extension side check valve 62 in the downstream side of the extension side flow paths (the extension and compression common flow paths 41, 42 and 43, the extension side flow paths 50B and 60A and the hole-like flow path 60C) so as to communicate the intermediate portion between the extension side damping valve 61 and the extension side check valve 62 in the extension side flow paths (the extension and compression common flow paths 41, 42 and 43, the extension side flow paths 50B and 60A and the hole-like flow path 60C) with the oil reservoir chamber 32 via the communication path 44.

In the compression side stroke, the boosted oil in the piston side oil chamber 27A passes through the compression side damping valve 51 in the upstream side of the compression side flow paths (the extension and compression common flow paths 41, 42 and 43, the compression side flow paths 50A and 60B and the hole-like flow path 60C) of the damping force generating device 40 so as to generate the compression side damping force. The flow of the one oil in the oil flowing out of the compression side damping valve 51 flows into the rod side oil chamber 27B from the compression side check valve 52 through the outer flow path 13C of the cylinder 13. Further, the flow of the oil at the inserting volume of the piston rod 14 which corresponds to the another flow of the oil in the oil flowing out of the compression side damping valve 51 flows into the oil reservoir chamber 32 from the communication path 44 of the second base piston 60. At this time, the pressure in the rod side oil chamber 27B approximately depends only on the pressure of the air chamber 31 (since the flow path resistance between the compression side check valve 52 in the downstream side of the compression side damping valve 51 and the outer flow path 13C of the cylinder 13 is small), and does not fluctuate by setting the flow path resistance of the compression side damping valve 51. Accordingly, it is possible to avoid a pause of the damping force at a time of the extension side reverse.

In the extension side stroke, the boosted oil in the rod side oil chamber 27B passes through the extension side damping valve 61 in the upstream side of the extension side flow paths (the extension and compression common flow paths 41, 42 and 43, the extension side flow paths 50B and 60A and the hole-like flow path 60C) of the damping force generating device 40 via the outer flow path 13C of the cylinder 13 so as to generate the extension side damping force. The oil flowing out of the extension side damping valve 61 is mixed with the oil at the going-out volume of the piston rod 14 which is replenished from the oil reservoir chamber 32 via the communication path 44 of the second base piston 60, and thereafter flows into the piston side oil chamber 27A through the extension side check valve 62.

In this case, it is possible to set the pressure in the rod side oil chamber 27B to the relatively high positive pressure in the compression side stroke so as to improve damping response at a time of the extension side reverse, by setting the pressure in the air chamber 31 pressurizing the oil reservoir chamber 32 to the high pressure.

(b) The second base piston 60 is provided with the communication path 44 communicating the intermediate portion between the compression side damping valve 51 and the compression side check valve 52 which are provided in the respective compression side flow paths 50A and 60B of the first and second base pistons 50 and 60 with the oil reservoir chamber 32. This communication path 44 also communicate the intermediate portion between the extension side damping valve 61 and the extension side check valve 62 which are provided in the respective extension side flow paths 50B and 60A of the first and second base pistons 50 and 60 with the oil reservoir chamber 32. In accordance with this, it is possible to form the flow path of the oil in the item (a) mentioned above which flows out to the oil reservoir chamber 32 from the piston side oil chamber 27A through the damping force generating device 40 in the compression side stroke. Also, it is possible to form the flow path of the oil in the item (a) mentioned above which flows out to the piston side oil chamber 27A from the oil reservoir chamber 32 through the damping force generating device 40 in the extension side stroke, by the communication path 44 which is provided in the second base piston 60. Since the communication path 44 is a flow path such as a simple transverse hole or the like, it is possible to easily secure a flow path area between the oil chamber 27 of the cylinder 13 and the oil reservoir chamber 32, and to smoothly apply the pressure of the air chamber 31 to the rod side oil chamber 27B. It is possible to further securely avoid the pause of the damping force at a time of the extension side reverse. Further, the communication path 44 can set a flow path length thereof short and set a flow path resistance small, and can improve freedom of setting. Further, the communication path 44 can be formed by processing a hole in the second base piston 60, and can reduce cost without increasing the parts number.

(c) In the hydraulic shock absorber 10, the outer flow path 13C communicating the piston side oil chamber 27A and the rod side oil chamber 27B is provided in the periphery of the oil chamber 27 of the cylinder 13 in the damper case 11. The oil reservoir chamber 32 is provided in the periphery of the oil chamber 27 and the outer flow path 13C of the cylinder 13 in the damper case 11. Accordingly, it is structured such that the oil chamber 27 is provided in the center portion of the cylinder 13 in the damper case 11, the outer flow path 13C is provided in the outer side of the oil chamber 27, and the oil reservoir chamber 32 is provided further in the outer side of the outer flow path 13C. In accordance with this, in the hydraulic shock absorber 10, the oil chamber 27 of the cylinder 13, the outer flow path 13C and the oil reservoir chamber 32 can be additionally provided in the inner portion of the damper case 11 having a short overall length, without enlarging a dimension of the damper case 11, and it is possible to improve freedom of the layout in the vehicle to which this is mounted.

(d) The first and second base pistons 50 and 60 are fixedly provided around the bolt 70, and the second base piston 60 is immobilized to the bottom portion at the one end side of the cylinder 13. Accordingly, it is possible to easily assemble the first and second base pistons 50 and 60 at two positions along the axial direction of the cylinder 13.

(e) The damper case 11 inserts and fits the cylinder 13 to the inner portion of the damper tube 12. The cylinder 13 consists of the outer tube 13A and the inner tube 13B. The oil chamber 27 is formed in the inner portion of the inner tube 13B. The outer flow path 13C is formed between the outer tube 13A and the inner tube 13B, and the oil reservoir chamber 32 is formed between the damper tube 12 and the outer tube 13A. On the basis of a triple tube structure consisting of the damper tube 12, and the outer tube 13A and the inner tube 13B of the cylinder 13, it is possible to compactly realize the item (c) mentioned above.

(f) The communication path 44 is perforated from the intermediate portion of the compression side flow path 60B to the outer peripheral portion facing to the oil reservoir chamber 32, in the second base piston 60. In accordance with this, it is possible to simply form the communication path 44 in the item (b) mentioned above by the simple transverse hole which is provided in the second base piston 60.

In this case, the damping force generating device 40 may be accessorily provided with the compression side damping force generating means in the compression side check valve 52 which is provided in the downstream side of the compression side flow paths (the extension and compression common flow paths 41, 42 and 43, the compression side flow paths 50A and 60B and the hole-like flow path 60C). The compression side damping force generating means may be constructed by forming the compression side check valve 52 as a laminated disc valve, and/or forming the compression side flow path 60B provided with the compression side check valve 52 as a throttling flow path, or the like.

In accordance with this, in the compression side stroke, the flow of one oil in the oil flowing out of the compression side damping valve 51 in the upstream side flows into the rod side oil chamber 27B from the compression side check valve 52 through the outer flow path 13C of the cylinder 13. However, the compression side check valve 52 achieves the compression side damping force generating function as well as the check function. The compression side check valve 52 generates a damping force $\Delta F$ which depends on the piston speed. A pressure Pr in the rod side oil chamber 27B arrives at a value obtained by subtracting $\Delta F$ from a pressure Pa in the air chamber 31 pressurizing the oil reservoir chamber 32, that is, a value which is controlled while depending on the piston speed.

The pressure Pr of the rod side oil chamber 27B being controlled while depending on the piston speed in the compression side stroke as mentioned above means that it is possible to control a rising characteristic of the damping force at a time of the extension side reverse while depending on the piston speed. When the piston speed is high, $\Delta F$ becomes larger by a throttling of the compression side check valve 52, and Pr becomes smaller. Accordingly, the rising edge of the damping force at a time of the extension side reverse becomes slow so as to improve a ride quality. When the piston speed is low, $\Delta F$ by the throttling of the compression side check valve 52 becomes smaller, and Pr becomes larger. Accordingly, the rising edge of the damping force at a time of the extension side reverse becomes sharp so as to suppress a wobbling feeling of the vehicle body and improve a driving stability.

At this time, a total amount of the compression side damping force comes to a summation of the damping force of the compression side damping valve 51 and the damping force of the compression side check valve 52. However, the damping force of the compression side damping valve 51 is made larger in a normal setting. The total amount of the compression side damping force approximately depends on the damping force of the compression side damping valve 51.

Further, the damping force generating device 40 may be accessorily provided with the extension side damping force generating means in the extension side check valve 62 provided in the downstream side of the extension side flow paths (the extension and compression common flow paths 41, 42 and 43, the extension side flow paths 50B and 60A and the hole-like flow path 60C). The extension side damping force generating means may be constructed by forming the extension side check valve 62 as a laminated disc valve, and/or forming the extension side flow path 50B provided with the extension side check valve 62 as a throttling flow path, or the like.

In accordance with this, in the extension side stroke, the flow of the one oil in the oil flowing out of the extension side damping valve 61 in the upstream side flows into the piston side oil chamber 27A from the extension side check valve 62 through the outer flow path 13C of the cylinder 13. However, the extension side check valve 62 achieves the extension side damping force generating function as well as the check function. The extension side check valve 62 generates the damping force $\Delta F$ which depends on the piston speed. A pressure Pp in the piston side oil chamber 27A arrives at a value obtained by subtracting $\Delta F$ from the pressure Pa in the air chamber 31 pressurizing the oil reservoir chamber 32, that is, a value which is controlled while depending on the piston speed.

The pressure Pp of the piston side oil chamber 27A being controlled while depending on the piston speed in the extension side stroke as mentioned above means that it is possible to control a rising characteristic of the damping force at a time of the compression side reverse while depending on the piston speed. When the piston speed is high, $\Delta F$ becomes larger by a throttling of the extension side check valve 62, and Pp becomes smaller. Accordingly, the rising edge of the damping force at a time of the compression side reverse becomes slow so as to improve ride quality. When the piston speed is low, $\Delta F$ by the throttling of the extension side check valve 62 becomes smaller, and Pp becomes larger. Accordingly, the rising edge of the damping force at a time of the compression side reverse becomes sharp so as to suppress a wobbling feeling of the vehicle body and improve driving stability.

At this time, a total amount of the extension side damping force results from a summation of the damping force of the extension side damping valve 61 and the damping force of the extension side check valve 62. However, the damping force of the extension side damping valve 61 is made larger in a normal setting. The total amount of the extension side damping force approximately depends on the damping force of the extension side damping valve 61.

Embodiment 2

Figure 8:
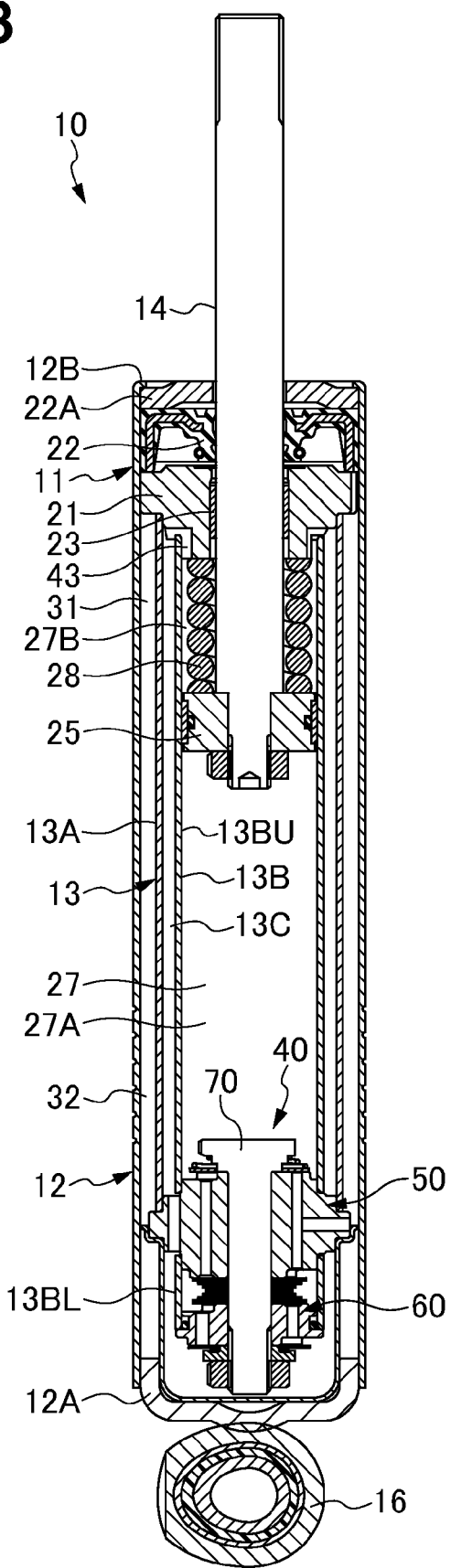
FIG. 8 is a whole cross sectional view showing a hydraulic shock absorber in accordance with an embodiment 2.
Figure 9:
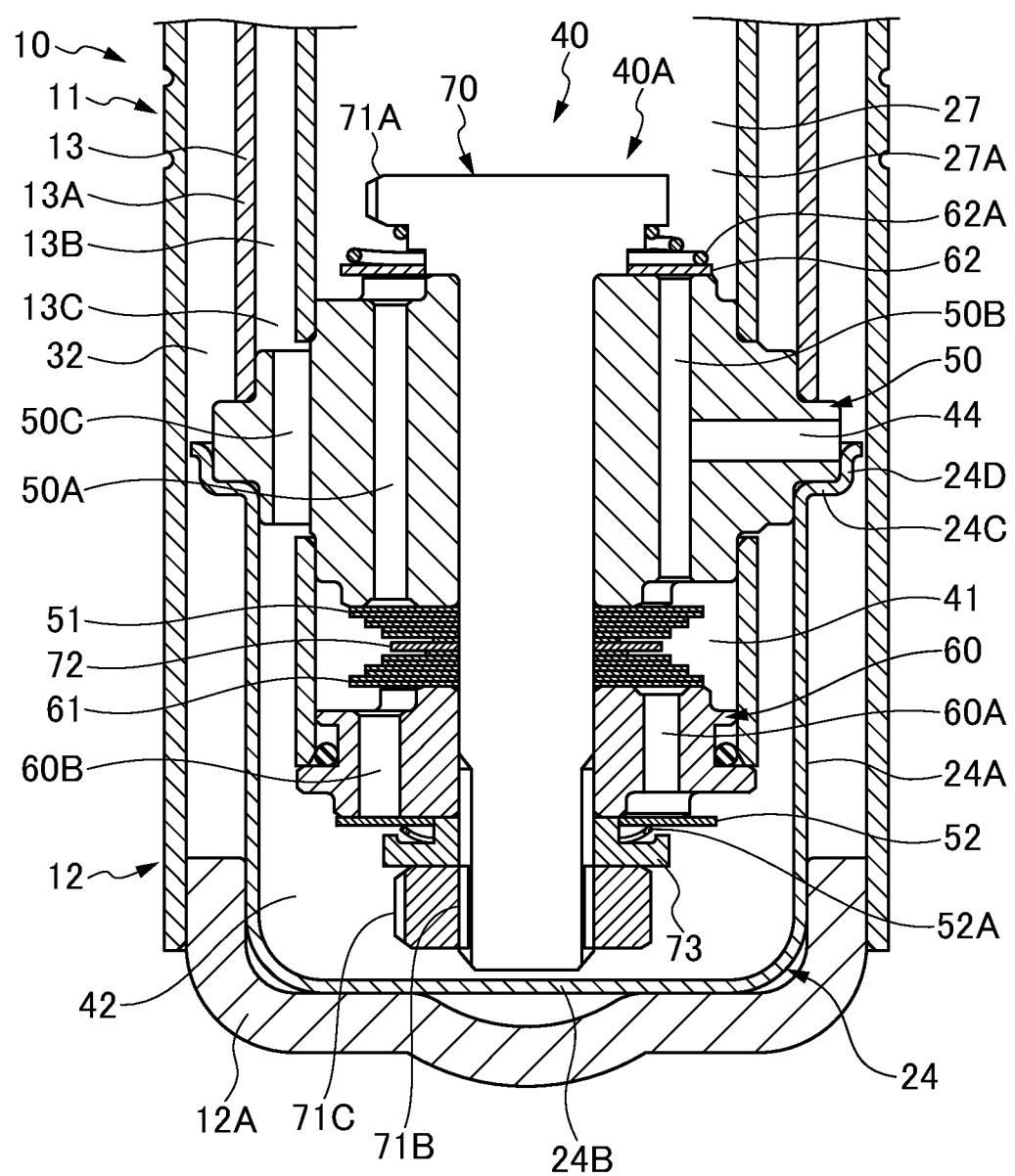
FIG. 9 is a cross sectional view showing a damping force generating device.
Figure 10:
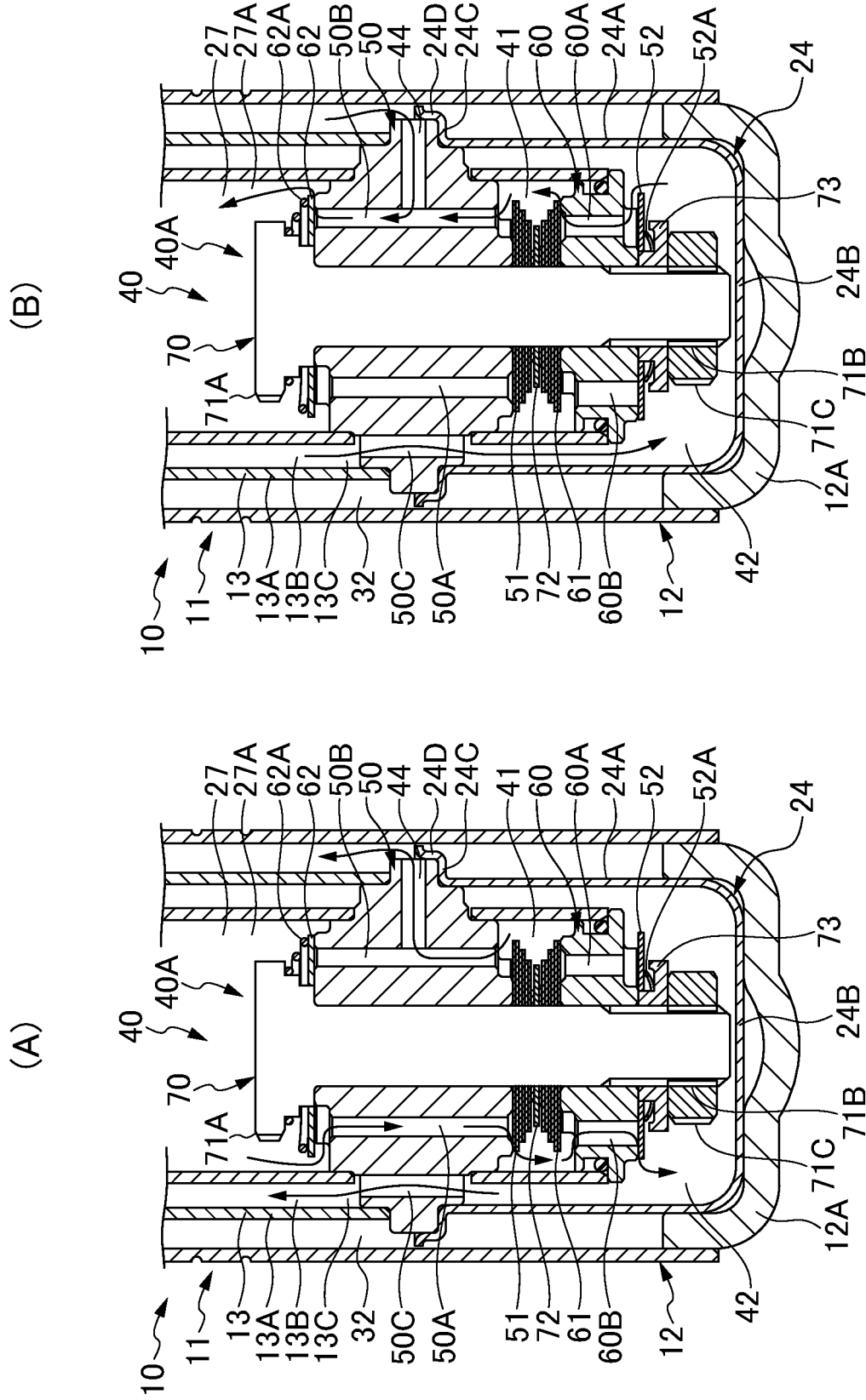

(FIGS. 8 to 10)

A hydraulic shock absorber 10 in accordance with an embodiment 2 is substantially different from the hydraulic shock absorber 10 in accordance with the embodiment 1 in that the communication path 44 is perforated from an intermediate portion of the extension side flow path 50B to an outer peripheral portion facing to the oil reservoir chamber 32 in the first base piston 50.

In other words, in the hydraulic shock absorber 10 in accordance with the embodiment 2, a body portion 24A of a cup-shaped bottom plate 24 which is clearance fitted to an inner surface of the cup of the bottom cap 12A so as to be centering arranged rises up above a cup upper end surface of the bottom cap 12A. A middle outer diameter portion in an outer periphery of a lower portion of the first base piston 50 is pressed into an inner periphery of an upper end portion of the body portion 24A so as to be centering arranged. A lower end surface of a large outer diameter portion of the first base piston 50 is mounted on an upper surface of a flange 24C which is connected to the body portion 24A of the bottom plate 24. An outer periphery of the large outer diameter portion of the first base piston 50 is pressed into an inner periphery of a fitting tube portion 24D which rises up from an outer periphery of the flange 24C of the bottom plate 24 so as to be centering arranged. An inner periphery of a lower end of the outer tube 13A of the cylinder 13 is fixed to a middle outer diameter portion in an outer periphery of an upper portion of the first base piston 50 by press fitting or the like. Further, the inner tube 13B of the cylinder 13 is separated into an upper inner tube 13BU having a long dimension and a lower inner tube 13BL having a short dimension. An upper end inner periphery of the upper inner tube 13BU is fixed to a small outer diameter portion below a head portion 21A of the rod guide 21 by press fitting or the like. An inner periphery of a lower end of the upper inner tube 13BU is fixed to a small outer diameter portion in an outer periphery of the upper portion of the first base piston 50 by press fitting or the like. Further, an inner periphery of an upper end of the lower inner tube 13BL is fixed to a small outer diameter portion in an outer periphery of the lower portion of the first base piston 50 by press fitting or the like, and an inner periphery of a lower end of the lower inner tube 13BL is fixed to an outer periphery of the second base piston 60 in a liquid tight manner via an O-ring by press fitting or the like. The upper inner tube 13BU and the lower inner tube 13BL of the cylinder 13 are pressed into the respective small outer diameter portions in the outer periphery of the upper portion and the outer periphery of the lower portion of the first base piston 50 so as to be arranged at the same diameter and the same axis with each other.

In the hydraulic shock absorber 10, the damper tube 12 is structured such that the outer tube 13A and the upper inner tube 13BU of the cylinder 13 are pinched and fixed in the axial direction between the bottom cap 12A and the caulking portion 12B via the rod guide 21, an oil seal 22, a washer 22A, the bottom plate 24, and the first base piston 50.

In the hydraulic shock absorber 10, the damping force generating device 40 has the first and second base pistons 50 and 60 which are arranged at two positions aligned along the axial direction of the cylinder 13.

The damping force generating device 40 is inserted into and attached to a lower end inner periphery of each of the outer tube 13A and the inner tube 13B of the cylinder 13 so as to be embedded, in a state of a valve unit 40A in which the first and second base pistons 50 and 60 are fixedly provided around the bolt 70.

The valve unit 40A of the damping force generating device 40 has an extension side check valve 62 (a valve spring 62A), the first base piston 50, a compression side damping valve 51, a valve stopper 72, an extension side damping valve 61, the second base piston 60, a compression side check valve 52 (a valve spring 52A), and a valve stopper 73. The structure is loaded in a skewering manner to an outer periphery of a rod-like thread portion 71B one by one from a side of a head portion 71A of the bolt 70, and are immobilized by a nut 71C which is attached by screw to a rod-like thread portion 71B.

The valve unit 40A of the damping force generating device 40 is structured such that the large outer diameter portion of the outer periphery of the first base piston 50 is assembled as mentioned above with respect to the flange 24C and the fitting tube portion 24D of the bottom plate 24 which is clearance fitted to the bottom cap 12A. The respective lower end inner peripheries of the outer tube 13A and the upper inner tube 13BU of the cylinder 13 are assembled as mentioned above with respect to the middle outer diameter portion and the small outer diameter portion of the outer periphery of the first base piston 50. The upper end inner periphery of the lower inner tube 13BL is assembled as mentioned above. The second base piston 60 is inserted into and attached in a liquid tight manner to the inner periphery of the lower inner tube 13BL of the cylinder 13 via an O-ring which is provided in an outer periphery. In accordance with this, the second base piston 60 of the valve unit 40A is immobilized to the bottom portion in one end side of the cylinder 13, and the first base piston 50 of the valve unit 40A is immobilized to the inner periphery of the cylinder 13.

The damping force generating device 40 sets an annular space which is pinched by the first base piston 50 and the second base piston 60 in the inner portion of the inner tube 13B to an extension and compression common flow path 41. An upper space of the first base piston 50 in the inner portion of the inner tube 13B is set to the piston side oil chamber 27A. A lower space of the second base piston 60 in the inner portion of the inner tube 13B is set to an extension and compression common flow path 42 which is communicated with the rod side oil chamber 27B via the hole-like flow path 50C perforated in the first base piston 50, and the outer flow path 13C between the outer tube 13A and the inner tube 13B of the cylinder 13. An extension and compression common flow path 43 which communicates the rod side oil chamber 27B with the outer flow path 13C is formed in a notched manner in an upper end side of the inner tube 13B, a small outer diameter portion of the rod guide 21 in the present embodiment.

Further, the damping force generating device 40 is provided in the first base piston 50 with a compression side flow path 50A which is opened and closed by the compression side damping valve 51, and an extension side flow path 50B which is opened and closed by the extension side check valve 62. The device is provided in the second base piston 60 with a compression side flow path 60B which is opened and closed by the compression side check valve 52, and an extension side flow path 60A which is opened and closed by the extension side damping valve 61. The damping force generating device 40 communicates the piston side oil chamber 27A and the rod side oil chamber 27B of the cylinder 13. This is accomplished via the extension and compression common flow paths 41, 42 and 43, the compression side flow path 50A, the extension side flow path 50B and the hole-like flow path 50C which are provided in the first base piston 50, the compression side flow path 60B, the extension side flow path 60A which are provided in the second base piston 60, and the outer flow path 13C which is provided in an annular gap of the outer tube 13A and the inner tube 13B of the cylinder 13 (the piston 25 is not provided with a flow path which communicates the piston side oil chamber 27A and the rod side oil chamber 27B).

The damping force generating device 40 is provided in the first base piston 50 with a communication path 44 which communicates an intermediate portion between the compression side damping valve 51 and the compression side check valve 52 which are provided in the respective compression side flow paths 50A and 60B of the first base piston 50 and the second base piston 60 (a portion communicating with the extension and compression common flow path 41) with the oil reservoir chamber 32. The device also communicates an intermediate portion between the extension side damping valve 61 and the extension side check valve 62 which are provided in the respective extension side flow paths 50B and 60A of the first base piston 50 and the second base piston 60 (a portion communicating with the extension and compression common flow path 41) with the oil reservoir chamber 32.

The first base piston 50 makes a part of an outer periphery of a large outer diameter portion which is pressed into the fitting tube portion 24D of the bottom plate 24 face to the oil reservoir chamber 32, at a time of being assembled in the damper tube 12 of the damper case 11 and the cylinder 13 as mentioned above. Further, the first base piston 50 is perforated a transverse hole which runs into the intermediate portion of the extension side flow path 50B from a part of the outer periphery mentioned above of the large outer diameter portion toward a radial direction, as shown in FIG. 9, and sets the transverse hole to the communication path 44.

Accordingly, in the damping force generating device 40 of the hydraulic shock absorber 10, it is structured such as to use the compression side flow paths (the extension and compression common flow paths 41, 42 and 43, the compression side flow paths 50A and 60B and the hole-like flow path 50C) which circulate the oil in the piston side oil chamber 27A of the cylinder 13 via the outer flow path 13C of the cylinder 13 toward the rod side oil chamber 27B, in the compression side stroke. The device is provided with the compression side damping valve 51 in an upstream side of the compression side flow paths (the extension and compression common flow paths 41, 42 and 43, the compression side flow paths 50A and 60B and the hole-like flow path 50C). The device is provided with the compression side check valve 52 in a downstream side thereof, and communicate an intermediate portion between the compression side damping valve 51 and the compression side check valve 52 in the compression side flow paths (the extension and compression common flow paths 41, 42 and 43, the compression side flow paths 50A and 60B and the hole-like flow path 50C) with the oil reservoir chamber 32 via the communication path 44.

Further, it is structured such as to use the extension side flow paths (the extension and compression common flow paths 41, 42 and 43, the extension side flow paths 50B and 60A and the hole-like flow path 50C) which circulate the oil in the rod side oil chamber 27B of the cylinder 13 via the outer flow path 13C of the cylinder 13 toward the piston side oil chamber 27A, in the extension side stroke. The device is provided with the extension side damping valve 61 in an upstream side of the extension side flow paths (the extension and compression common flow paths 41, 42 and 43, the extension side flow paths 50B and 60A and the hole-like flow path 50C). The device is provided with the extension side check valve 62 in a downstream side thereof. The device communicates an intermediate portion between the extension side damping valve 61 and the extension side check valve 62 in the extension side flow paths (the extension and compression common flow paths 41, 42 and 43, the extension side flow paths 50B and 60A and the hole-like flow path 50C) with the oil reservoir chamber 32 via the communication path 44.

Accordingly, the hydraulic shock absorber 10 carries out a damping action in the following manner.

(Compression Side Stroke) (Flow of Solid Arrow in FIG. 10(A))

The oil in the piston side oil chamber 27A is boosted, and pushes open the compression side damping valve 51 in the compression side flow path 50A of the first base piston 50 of the damping force generating device 40 so as to generate the compression side damping force. The oil flowing out of the compression side damping valve 51 to the extension and compression common flow path 41 is separated into two paths. In the extension and compression common flow path 41, one oil flows out to the rod side oil chamber 27B from the compression side check valve 52 in the compression side flow path 60B of the second base piston 60 through the extension and compression common flow path 42, the hole-like flow path 50C of the first base piston 50, the outer flow path 13C of the cylinder 13 and the extension and compression common flow path 43. Another oil is discharged to the oil reservoir chamber 32 from the communication path 44 of the first base piston 50. Another oil discharged to the oil reservoir chamber 32 compensates the oil at an inserting volume of the piston rod 14.

(Extension Side Stroke) (Flow of Solid Arrow in FIG. 10(B))

The oil in the rod side oil chamber 27B is boosted, flows into the hole-like flow path 50C of the first base piston 50 of the damping force generating device 40 and the extension and compression common flow path 42 through the extension and compression common flow path 43 and the outer flow path 13C of the cylinder 13, and pushes open the extension side damping valve 61 in the extension side flow path 60A of the second base piston 60 so as to generate the extension side damping force. The oil flowing out of the extension side damping valve 61 to the extension and compression common flow path 41 is mixed with the oil which is replenished from the oil reservoir chamber 32 via the communication path 44 of the first base piston 50 in the extension side flow path 50B of the first base piston 50, and thereafter flows out to the piston side oil chamber 27A through the extension side check valve 62 in the extension side flow path 50B of the first base piston 50. The oil replenished from the oil reservoir chamber 32 compensates the oil at the going-out volume of the piston rod 14.

Therefore, in accordance with the present embodiment, in addition to the operations and effects (a) to (e) in the embodiment 1, the following operation and effect can be achieved.

The communication path 44 is perforated from the intermediate portion of the extension side flow path 50B to the outer peripheral portion facing to the oil reservoir chamber 32, in the first base piston 50. In accordance with this, it is possible to simply form the communication path 44 in the item (b) mentioned above by the simple transverse hole which is provided in the first base piston 50.

Embodiment 3

FIGS. 11 to 14

Figure 11:
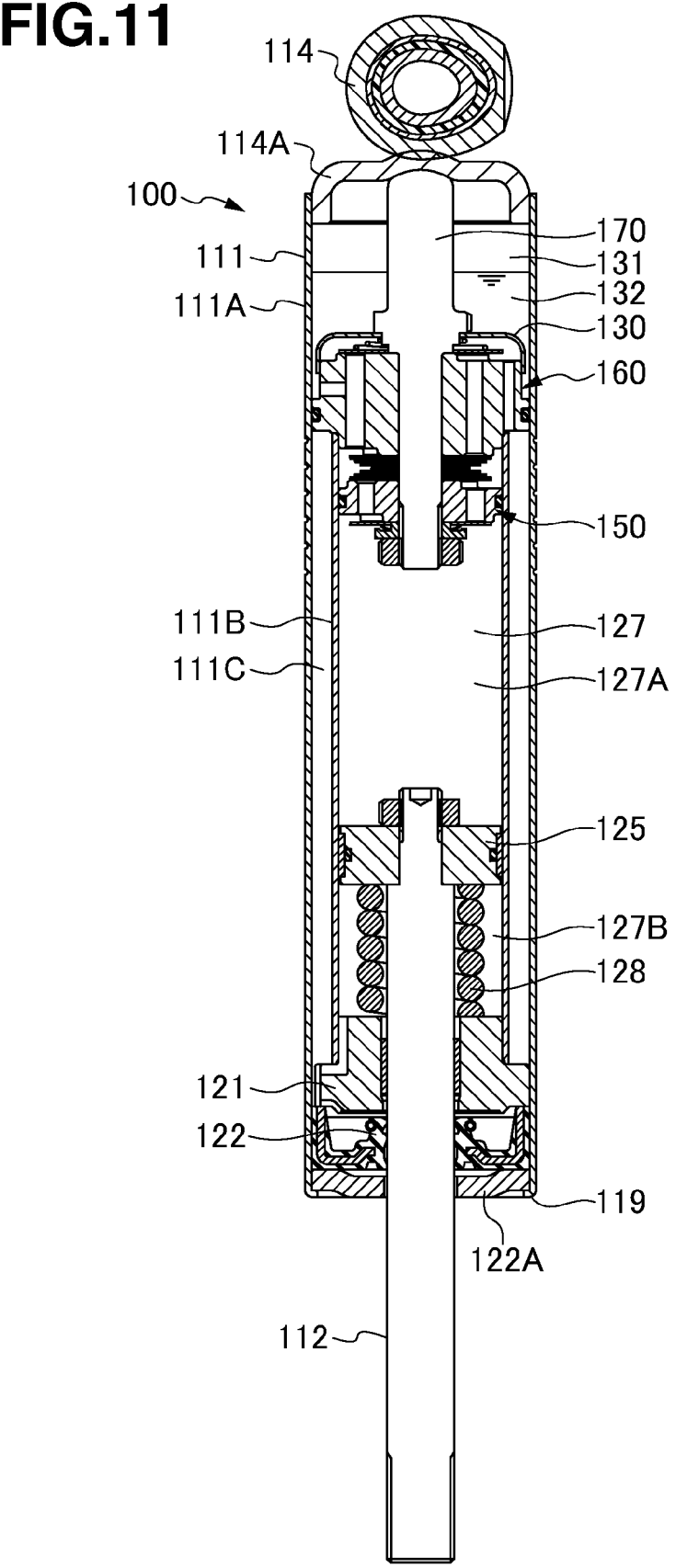
FIG. 11 is a whole cross sectional view showing a hydraulic shock absorber in accordance with an embodiment 3.
Figure 12:
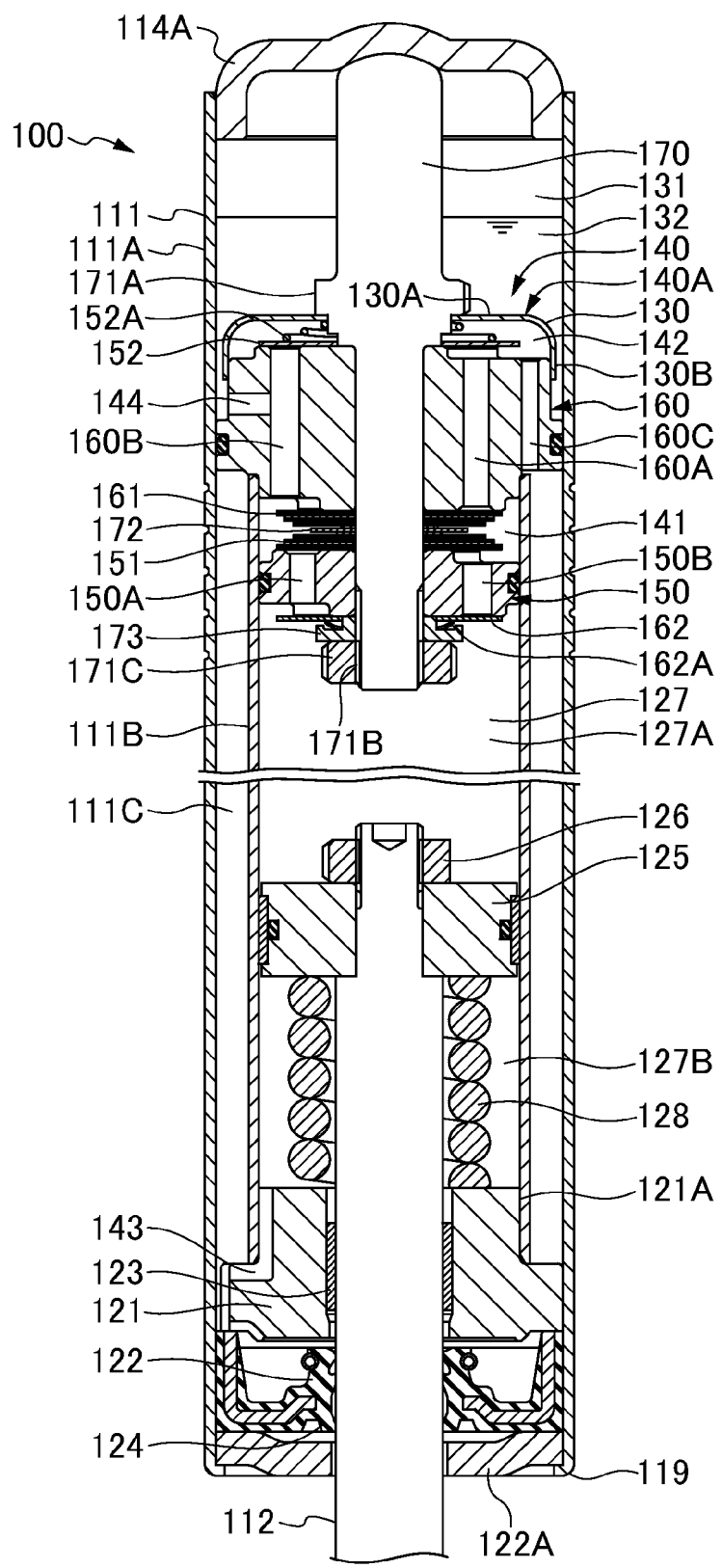
FIG. 12 is a cross sectional view of a substantial part in FIG. 11.
Figure 13:
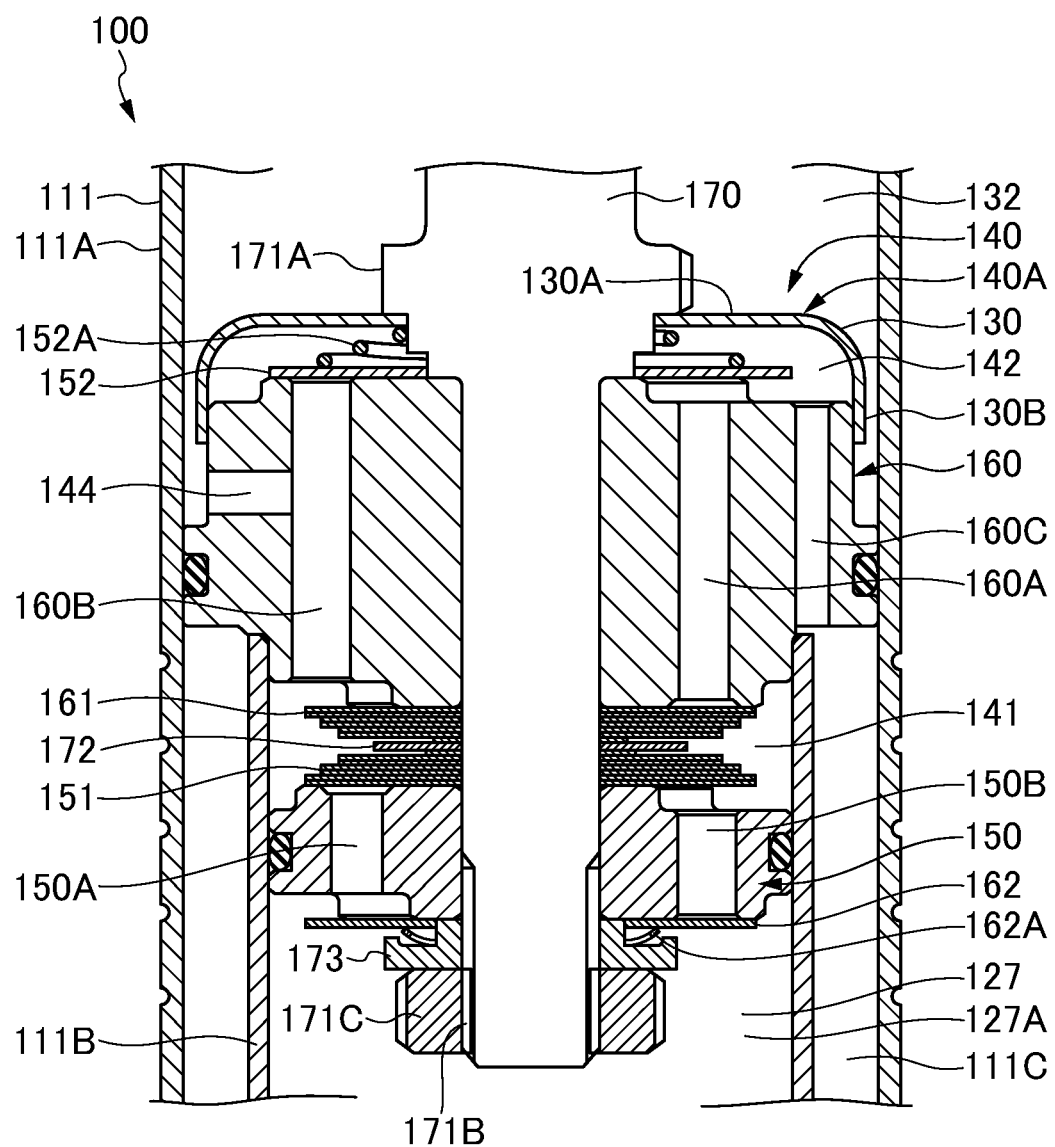
FIG. 13 is a cross sectional view showing a damping force generating device.
Figure 14:
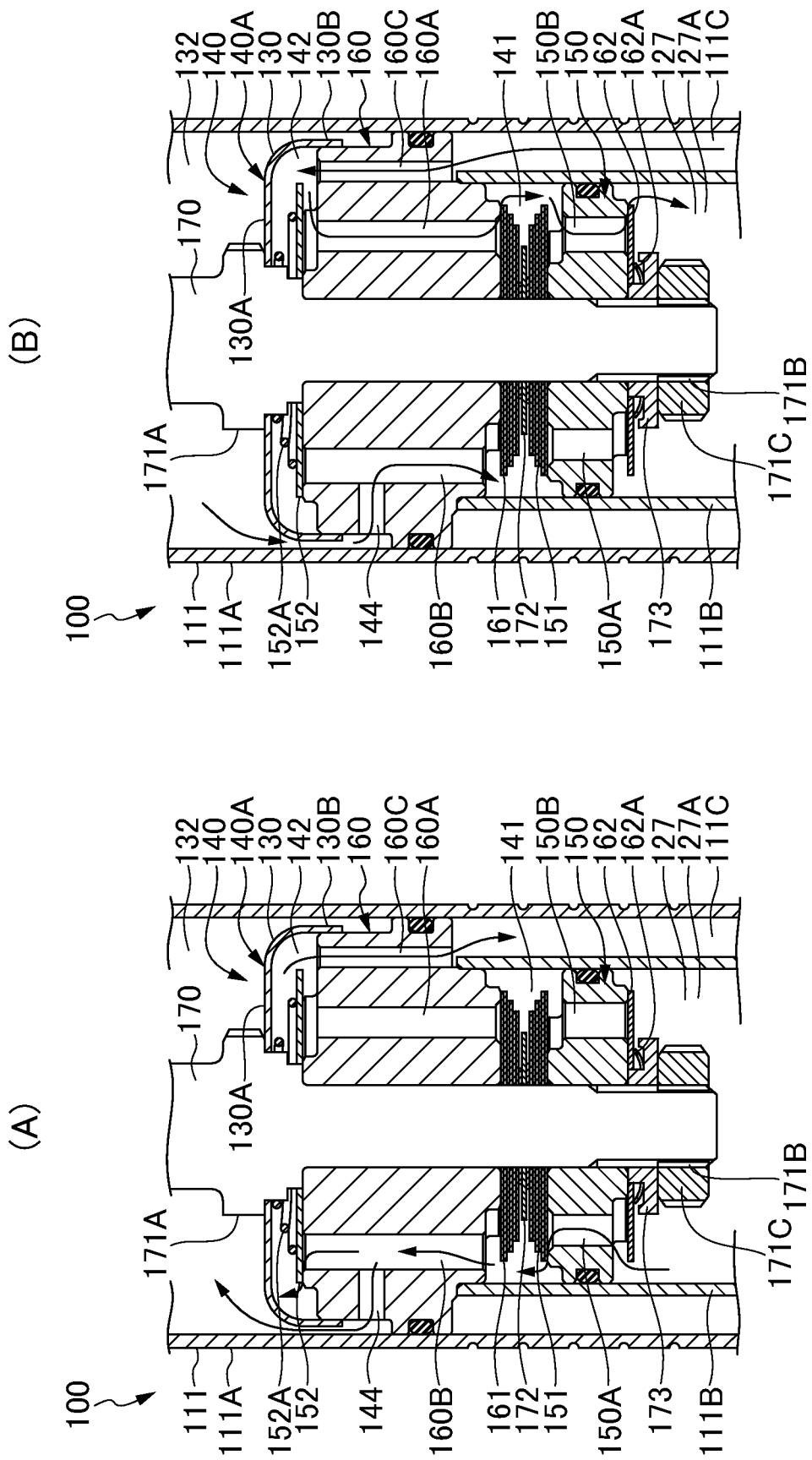

A hydraulic shock absorber 100 is structured, as shown in FIGS. 11 to 13, such that a piston rod 112 which is attached to an axle side is slidably inserted into an oil chamber 127 of a damper cylinder 111 which is attached to a vehicle body side and constructs a damper case. A suspension spring 113 which is not illustrated is interposed to outer portions of the cylinder 111 and the piston rod 112.

The cylinder 111 is provided with a vehicle body side attaching member 114, and the piston rod 112 is provided with an axle side attaching member 115 which is not illustrated. A spring receiver 117 which is not illustrated is provided in an outer peripheral portion of the cylinder 111, and a spring receiver 118 which is not illustrated is provided in an outer portion of the axle side attaching member 115. The suspension spring 113 is interposed between the spring receiver 117 and the spring receiver 118, and a spring force of the suspension spring 113 absorbs a shock force which a vehicle receives from a road surface.

The cylinder 111 is provided in its opening portion with a rod guide 121 through which the piston rod 112 passes. The rod guide 121 is inserted into and attached in a liquid tight manner to the cylinder 111, and makes the piston rod 112 slidable in a liquid tight manner in an inner diameter portion provided with an oil seal 122, a bush 123 and a dust seal 124.

The hydraulic shock absorber 100 is structured such that the cylinder 111 consists of an outer tube 111A and an inner tube 111B, and an upper end inner periphery of the outer tube 111A is fitted to an outer periphery of a cup-shaped top cap 114A provided with the vehicle body side attaching member 114 so as to be fixed by welding or the like.

An upper end convex portion of a bolt 170 constructing a damping force generating device 140 mentioned below is brought into contact with a center concave portion of the top cap 114A. A large outer diameter portion of a second base piston 160 which is provided as mentioned below in the bolt 170 is inserted into and attached to an inner periphery of an intermediate portion of the outer tube 111A via an O-ring so as to be centering arranged. An upper end inner periphery of the inner tube 111B is fixed by a press fitting or the like to a small outer diameter portion in a lower end side of the second base piston 160. An outer diameter portion of a first base piston 150 which is provided as mentioned below in the bolt 170 and forms the same axis as the second base piston 160 is inserted into and attached to an inner periphery of an intermediate portion of the inner tube 111B via an O-ring so as to be centering arranged.

On the other hand, a lower end inner periphery of the inner tube 111B of the cylinder 111 is fixed to a small outer diameter portion above a head portion 121A of the rod guide 121 by a press fitting or the like. The outer tube 111A of the cylinder 111 is inserted into and attached to a large outer diameter portion of the head portion 121A of the rod guide 121, and protrudes below an oil seal 122 which is below the head portion 121A and a washer 122A which is provided in a lower side of the oil seal 122, and a protruding end is set to a caulking portion 119. The outer tube 111A is structured such as to pinch and fix the inner tube 111B in an axial direction between the top cap 114A and the caulking portion 119 via the rod guide 121, the oil seal 122, the washer 122A, the second base piston 160 and the bolt 170.

In the hydraulic shock absorber 100, in accordance with the above, a whole of the damper case is formed as a double tube in which the outer tube 111A and the inner tube 111B of the cylinder 111 are coaxially arranged. Further, a piston 125 inserted into and attached to a leading end portion of the piston rod 112 is fixed by a nut 126. An oil chamber 127 pinched between the rod guide 121 and the base piston 150 in an inner portion of the inner tube 111B is divided into a piston side oil chamber 127A and a rod side oil chamber 127B by the piston 125 which is inserted slidably into an inner periphery of the inner tube 111B. Further, an outer flow path 111C communicating the piston side oil chamber 127A and the rod side oil chamber 127B is formed by an annular gap between the outer tube 111A and the inner tube 111B. Reference numeral 128 denotes a rebound spring.

The hydraulic shock absorber 100 is provided with an air chamber 131 and an oil reservoir chamber 132 in an upper portion of the oil chamber 127 in the outer tube 111A. Specifically, a cup-shaped top plate 130 made of a steel plate press is inserted into and attached to an upper portion of the second base piston 160 around the bolt 170, and the air chamber 131 and the oil reservoir chamber 132 are provided within the outer tube 111A in the upper portion of the top plate 130. The top plate 130 fits and attaches a top portion 130A to a lower portion of an intermediate flange portion 171A of the bolt 170. The top plate 130 is nipped to the flange portion 171A by a valve spring 152A of a compression side check valve 152 mentioned below, and is fixedly fitted and attached an inner periphery of the body portion 130B to an outer periphery of the second base piston 160. An upper space of the oil reservoir chamber 132 comes to the air chamber 131. The oil reservoir chamber 132 is communicated with the oil chamber 127 in the inner portion of the inner tube 111B by a communication path 144 which is provided as mentioned below in the second base piston 160. The oil reservoir chamber 132 compensates a volumetric capacity (including a volumetric capacity of a temperature expanding amount of the oil) of the piston rod 112 which goes to and out of the oil chamber 127 of the cylinder 111.

The hydraulic shock absorber 100 is provided with the damping force generating device 140 between the piston side oil chamber 127A and the rod side oil chamber 127B of the cylinder 111.

The damping force generating device 140 has first and second base pistons 150 and 160 which are arranged at two positions aligned along the axial direction of the cylinder 111.

The damping force generating device 140 is inserted into and attached to an upper end inner periphery of each of the outer tube 111A and the inner tube 111B of the cylinder 111 so as to be embedded, in a state of a valve unit 140A in which the first and second base pistons 150 and 160 are fixedly provided around the bolt 170.

The valve unit 140A of the damping force generating device 140 has a cup-shaped top plate 130, a compression side check valve 152 (a valve spring 152A), a second base piston 160, an extension side damping valve 161, a valve stopper 172, a compression side damping valve 151, the first base piston 150, an extension side check valve 162 (a valve spring 162A), and a valve stopper 173. The elements are loaded in a skewering manner to an outer periphery of a rod-like thread portion 171B one by one from a side of the intermediate flange portion 171A of the bolt 170, and immobilizes them by a nut 171C which is attached by screw to a rod-like thread portion 171B.

The valve unit 140A of the damping force generating device 140 is structured such that the large outer diameter portion of the outer periphery of the second base piston 160 is assembled as mentioned above with respect to the inner periphery of the intermediate portion of the outer tube 111A of the cylinder 111, and the upper end inner periphery of the inner tube 111B of the cylinder 111 is assembled as mentioned above with respect to the small outer diameter portion of the outer periphery of the second base piston 160. The first base piston 150 is inserted into and attached in a liquid tight manner to the inner periphery of the inner tube 111B of the cylinder 111 via an O-ring which is provided in an outer periphery. In accordance with this, the first base piston 150 and the second base piston 160 of the valve unit 140A are immobilized to the upper end side of the cylinder 111.

The damping force generating device 140 sets an annular space which is pinched by the first base piston 150 and the second base piston 160 in the inner portion of the inner tube 111B to an extension and compression common flow path 141. A lower space of the first base piston 150 in the inner portion of the inner tube 111B is set to the piston side oil chamber 127A. An upper space of the second base piston 160 in the inner portion of the inner tube 111B is set to an extension and compression common flow path 142 which is communicated with the rod side oil chamber 127B via a hole-like flow path 160C perforated in the second base piston 160, and the outer flow path 111C between the outer tube 111A and the inner tube 111B of the cylinder 111, in a state of being divided from the oil reservoir chamber 132 by the top plate 130 which is attached to an upper portion of the second base piston 160. An extension and compression common flow path 143 which communicates the rod side oil chamber 127B with the outer flow path 111C is formed in a notched manner in a lower end side of the inner tube 111B, a small outer diameter portion of the rod guide 121 in the present embodiment.

Further, the damping force generating device 140 is provided in the first base piston 150 with a compression side flow path 150A which is opened and closed by the compression side damping valve 151, and an extension side flow path 150B which is opened and closed by the extension side check valve 162. The device is provided in the second base piston 160 with a compression side flow path 160B which is opened and closed by the compression side check valve 152, and an extension side flow path 160A which is opened and closed by the extension side damping valve 161. The damping force generating device 140 communicates the piston side oil chamber 127A and the rod side oil chamber 127B of the cylinder 111 via the extension and compression common flow paths 141, 142 and 143, the compression side flow path 150A and the extension side flow path 150B which are provided in the first base piston 150, the compression side flow path 160B, the extension side flow path 160A and the hole-like flow path 160C which are provided in the second base piston 160, and the outer flow path 111C which is provided in an annular gap of the outer tube 111A and the inner tube 111B of the cylinder 111 (the piston 125 is not provided with a flow path which communicates the piston side oil chamber 127A and the rod side oil chamber 127B).

The damping force generating device 140 is provided in the second base piston 160 with a communication path 144 which communicates an intermediate portion between the compression side damping valve 151 and the compression side check valve 152 which are provided in the respective compression side flow paths 150A and 160B of the first base piston 150 and the second base piston 160 (a portion communicating with the extension and compression common flow path 141) with the oil reservoir chamber 132. The device communicates an intermediate portion between the extension side damping valve 161 and the extension side check valve 162 which are provided in the respective extension side flow paths 150B and 160A of the first base piston 150 and the second base piston 160 (a portion communicating with the extension and compression common flow path 141) with the oil reservoir chamber 132.

The second base piston 160 makes a part of an outer periphery of a large outer diameter portion to which the body portion 130B of the top plate 130 is fitted and attached face to the oil reservoir chamber 132, at a time of being assembled in the outer tube 111A of the cylinder 111 of the damper case as mentioned above. Further, the second base piston 160 is perforated with a transverse hole which runs into the intermediate portion of the compression side flow path 160B from a part of the outer periphery mentioned above of the large outer diameter portion toward a radial direction, as shown in FIG. 13, and sets the transverse hole to the communication path 144. The transverse path 144 is communicated with the oil reservoir chamber 132 via an outer periphery of the body portion 130B of the top plate 130.

Accordingly, in the damping force generating device 140 of the hydraulic shock absorber 100, it is structured such as to use the compression side flow paths (the extension and compression common flow paths 141, 142 and 143, the compression side flow paths 150A and 160B and the hole-like flow path 160C) which circulate the oil in the piston side oil chamber 127A of the cylinder 111 via the outer flow path 111C of the cylinder 111 toward the rod side oil chamber 127B, in the compression side stroke. The device is provided with the compression side damping valve 151 in an upstream side of the compression side flow paths (the extension and compression common flow paths 141, 142 and 143, the compression side flow paths 150A and 160B and the hole-like flow path 160C). The device is provided with the compression side check valve 152 in a downstream side thereof, The device communicates an intermediate portion between the compression side damping valve 151 and the compression side check valve 152 in the compression side flow paths (the extension and compression common flow paths 141, 142 and 143, the compression side flow paths 150A and 160B and the hole-like flow path 160C) with the oil reservoir chamber 132 via the communication path 144.

Further, it is structured such as to use the extension side flow paths (the extension and compression common flow paths 141, 142 and 143, the extension side flow paths 150B and 160A and the hole-like flow path 160C) which circulate the oil in the rod side oil chamber 127B of the cylinder 111 via the outer flow path 111C of the cylinder 111 toward the piston side oil chamber 127A, in the extension side stroke, be provided with the extension side damping valve 161 in an upstream side of the extension side flow paths (the extension and compression common flow paths 141, 142 and 143, the extension side flow paths 150B and 160A and the hole-like flow path 160C), be provided with the extension side check valve 162 in a downstream side thereof, and communicate an intermediate portion between the extension side damping valve 161 and the extension side check valve 162 in the extension side flow paths (the extension and compression common flow paths 141, 142 and 143, the extension side flow paths 150B and 160A and the hole-like flow path 160C) with the oil reservoir chamber 132 via the communication path 144.

Accordingly, the hydraulic shock absorber 100 carries out a damping action in the following manner.

(Compression Side Stroke) (Flow of Solid Arrow in FIG. 14(A))

The oil in the piston side oil chamber 127A is boosted, and pushes open the compression side damping valve 151 in the compression side flow path 150A of the first base piston 150 of the damping force generating device 140 so as to generate the compression side damping force. The oil flowing out of the compression side damping valve 151 to the extension and compression common flow path 141 is separated into two in the compression side flow path 160B of the second base piston 160. One oil flows out to the rod side oil chamber 127B from the compression side check valve 152 in the compression side flow path 160B of the second base piston 160 through the extension and compression common flow path 142, the hole-like flow path 160C of the second base piston 160, the outer flow path 111C of the cylinder 111 and the extension and compression common flow path 143, and another oil is discharged to the oil reservoir chamber 132 from the communication path 144 of the second base piston 160. Another oil discharged to the oil reservoir chamber 132 compensates the oil at an inserting volume of the piston rod 114.

(Extension Side Stroke) (Flow of Solid Arrow in FIG. 14(B))

The oil in the rod side oil chamber 127B is boosted, flows into the hole-like flow path 160C of the second base piston 160 of the damping force generating device 140 and the extension and compression common flow path 142 through the extension and compression common flow path 143 and the outer flow path 111C of the cylinder 111, and pushes open the extension side damping valve 161 in the extension side flow path 160A of the second base piston 160 so as to generate the extension side damping force. The oil flowing out of the extension side damping valve 161 to the extension and compression common flow path 141 is mixed with the oil which is replenished from the oil reservoir chamber 132 via the communication path 144 of the second base piston 160 and the compression side flow path 160B, and thereafter flows out to the piston side oil chamber 127A through the extension side check valve 162 in the extension side flow path 150B of the first base piston 150. The oil replenished from the oil reservoir chamber 132 compensates the oil at the going-out volume of the piston rod 114.

Therefore, in accordance with the present embodiment, the following operation and effect can be achieved.

(a) In the damping force generating device 140 of the hydraulic shock absorber 100, the damping force generating device 140 is provided between the piston side oil chamber 127A of the cylinder 111, and the rod side oil chamber 127B. The device is structured such as to use the compression side flow paths (the extension and compression common flow paths 141, 142 and 143, the compression side flow paths 150A and 160B and the hole-like flow path 160C) which circulate the oil in the piston side oil chamber 127A of the cylinder 111 toward the rod side oil chamber 127B via the outer flow path 111C of the cylinder 111 in the compression side stroke. The device is provided with the compression side damping valve 151 in the upstream side of the compression side flow paths (the extension and compression common flow paths 141, 142 and 143, the compression side flow paths 150A and 160B and the hole-like flow path 160C). The device is provided with the compression side check valve 152 in the downstream side thereof. The device communicates the intermediate portion between the compression side damping valve 151 and the compression side check valve 152 in the compression side flow paths (the extension and compression common flow paths 141, 142 and 143, the compression side flow paths 150A and 160B and the hole-like flow path 160C) with the oil reservoir chamber 132 via the communication path 144. The device uses the extension side flow paths (the extension and compression common flow paths 141, 142 and 143, the extension side flow paths 150B and 160A and the hole-like flow path 160C) which circulate the oil in the rod side oil chamber 127B of the cylinder 111 toward the piston side oil chamber 127A via the outer flow path 111C of the cylinder 111 in the extension side stroke. The device is provided with the extension side damping valve 161 in the upstream side of the extension side flow paths (the extension and compression common flow paths 141, 142 and 143, the extension side flow paths 150B and 160A and the hole-like flow path 160C). The device is provided with the extension side check valve 162 in the downstream side thereof. The device communicates the intermediate portion between the extension side damping valve 161 and the extension side check valve 162 in the extension side flow paths (the extension and compression common flow paths 141, 142 and 143, the extension side flow paths 150B and 160A and the hole-like flow path 160C) with the oil reservoir chamber 132 via the communication path 144.

In the compression side stroke, the boosted oil in the piston side oil chamber 127A passes through the compression side damping valve 151 in the upstream side of the compression side flow paths (the extension and compression common flow paths 141, 142 and 143, the compression side flow paths 150A and 160B and the hole-like flow path 160C) of the damping force generating device 140 so as to generate the compression side damping force. The flow of the one oil in the oil flowing out of the compression side damping valve 151 flows into the rod side oil chamber 127B from the compression side check valve 152 through the outer flow path 111C of the cylinder 111. Further, the flow of the oil at the inserting volume of the piston rod 112 which corresponds to the another flow of the oil in the oil flowing out of the compression side damping valve 151 flows into the oil reservoir chamber 132 from the communication path 144 of the second base piston 160. At this time, the pressure in the rod side oil chamber 127B approximately depends only on the pressure of the air chamber 131 (since the flow path resistance between the compression side check valve 152 in the downstream side of the compression side damping valve 151 and the outer flow path 111C of the cylinder 111 is small), and does not fluctuate by setting the flow path resistance of the compression side damping valve 151. Accordingly, it is possible to avoid a pause of the damping force at a time of the extension side reverse.

In the extension side stroke, the boosted oil in the rod side oil chamber 127B passes through the extension side damping valve 161 in the upstream side of the extension side flow paths (the extension and compression common flow paths 141, 142 and 143, the extension side flow paths 150B and 160A and the hole-like flow path 160C) of the damping force generating device 140 via the outer flow path 111C of the cylinder 111 so as to generate the extension side damping force. The oil flowing out of the extension side damping valve 161 is mixed with the oil at the going-out volume of the piston rod 112 which is replenished from the oil reservoir chamber 132 via the communication path 144 of the second base piston 160, and thereafter flows into the piston side oil chamber 127A through the extension side check valve 162.

In this case, it is possible to set the pressure in the rod side oil chamber 127B to the relatively high positive pressure in the compression side stroke so as to improve a damping response at a time of the extension side reverse, by setting the pressure in the air chamber 131 pressurizing the oil reservoir chamber 132 to the high pressure.

(b) The second base piston 160 is provided with the communication path 144 communicating the intermediate portion between the compression side damping valve 151 and the compression side check valve 152 which are provided in the respective compression side flow paths 150A and 160B of the first and second base pistons 150 and 160 with the oil reservoir chamber 132, and communicating the intermediate portion between the extension side damping valve 161 and the extension side check valve 162 which are provided in the respective extension side flow paths 150B and 160A of the first and second base pistons 150 and 160 with the oil reservoir chamber 132. In accordance with this, it is possible to form the flow path of the oil in the item (a) mentioned above which flows out to the oil reservoir chamber 132 from the piston side oil chamber 127A through the damping force generating device 140 in the compression side stroke and the flow path of the oil in the item (a) mentioned above which flows out to the piston side oil chamber 127A from the oil reservoir chamber 132 through the damping force generating device 140 in the extension side stroke, by the communication path 144 which is provided in the second base piston 160. Since the communication path 144 is a flow path such as a simple transverse hole or the like, it is possible to easily secure a flow path area between the oil chamber 127 of the cylinder 111 and the oil reservoir chamber 132, and to smoothly apply the pressure of the air chamber 131 to the rod side oil chamber 127B. It is possible to further securely avoid the pause of the damping force at a time of the extension side reverse. Further, the communication path 144 can set a flow path length thereof short and set a flow path resistance small, and can improve freedom of setting. Further, the communication path 144 can be formed by processing a hole in the second base piston 160, and can reduce cost without increasing the number of parts.

(c) In the hydraulic shock absorber 100, the oil reservoir chamber 132 is provided in the upper portion of the oil chamber 127 of the cylinder 111 in the damper case. In accordance with this, in the hydraulic shock absorber 100, the oil reservoir chamber 132 can be provided in the upper portion of the oil chamber 127 of the cylinder 111 in the damper case, without enlarging a diameter of the damper case, and it is possible to improve freedom of a layout in the vehicle to which this is mounted.

(d) The first and second base pistons 150 and 160 are fixedly provided around the bolt 170, and the first and second base pistons 150 and 160 are immobilized to the upper end side of the cylinder 111. Accordingly, it is possible to easily assemble the first and second base pistons 150 and 160 at two positions along the axial direction of the cylinder 111.

(e) The cylinder 111 provided in the damper case consists of the outer tube 111A and the inner tube 111B. The oil chamber 127 is formed in the inner portion of the inner tube 111B. The outer flow path 111C is formed between the outer tube 111A and the inner tube 111B, and the oil reservoir chamber 132 is formed in the inner portion of the outer tube 111A which is above the second base piston 160. On the basis of the double tube structure consisting of the outer tube 111A and the inner tube 111B of the cylinder 111, it is possible to compactly realize the item (c) mentioned above.

(f) The communication path 144 is perforated from the intermediate portion of the compression side flow path 160B to the outer peripheral portion facing to the oil reservoir chamber 132, in the second base piston 160. It is possible to simply form the communication path 144 in the item (b) mentioned above by the simple transverse hole which is provided in the second base piston 160.

In this case, the damping force generating device 140 may be accessorily provided with the compression side damping force generating structure in the compression side check valve 152 which is provided in the downstream side of the compression side flow paths (the extension and compression common flow paths 141, 142 and 143, the compression side flow paths 150A and 160B and the hole-like flow path 160C). The compression side damping force generating structure may be constructed by forming the compression side check valve 152 as a laminated disc valve, and/or forming the compression side flow path 160B provided with the compression side check valve 152 as a throttling flow path, or the like.

Further, the damping force generating device 140 may be accessorily provided with an extension side damping force generating means in the extension side check valve 162 which is provided in the downstream side of the extension side flow paths (the extension and compression common flow paths 141, 142 and 143, the extension side flow paths 150B and 160A and the hole-like flow path 160C). The extension side damping force generating means may be constructed by forming the extension side check valve 162 as a laminated disc valve, and/or forming the extension side flow path 150B provided with the extension side check valve 162 as a throttling flow path, or the like.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the damping force generating device may be provided in both of the first and second base pistons, as long as it is structured as follows. At least one of the first base piston and the second base piston is provided with the communication path which communicates the intermediate portion between the compression side damping valve and the compression side check valve which are provided in the respective compression side flow paths of the first base piston and the second base piston (the portion communicating with the extension and compression common flow path), with the oil reservoir chamber, and communicates the intermediate portion between the extension side damping valve and the extension side check valve which are provided in the respective extension side flow paths of the first base piston and the second base piston (the portion communicating with the extension and compression common flow path), with the oil reservoir chamber.

INDUSTRIAL APPLICABILITY

The present invention relate to a hydraulic shock absorber having an oil chamber of a cylinder provided in a damper case which is attached to one of a vehicle body side and an axle side. A piston rod is attached to another of the vehicle body side and the axle side, the piston rod being inserted into the oil chamber. A piston is provided in a leading end portion of the piston rod. The oil chamber of the cylinder is divided into a piston side oil chamber and a rod side oil chamber by the piston. An oil reservoir chamber compensates a volumetric capacity of the piston rod which goes to and out of the oil chamber of the cylinder, the oil reservoir chamber being communicated with the oil chamber of the cylinder. A damping force generating device is provided between the piston side oil chamber and the rod side oil chamber of the cylinder. An outer flow path communicates between the piston side oil chamber and the rod side oil chamber, the outer flow path being provided around the oil chamber of the cylinder in the damper case. The damping force generating device is provided with a compression side flow path which circulates an oil in the piston side oil chamber of the cylinder toward the rod side oil chamber via the outer flow path of the cylinder in a compression side stroke. The compression side flow path is provided with a compression side damping valve in its upstream side and with a compression side check valve in its downstream side, and an intermediate portion between the compression side damping valve and the compression side check valve which are provided in the compression side flow path are communicated with the oil reservoir chamber. The damping force generating device is provided with an extension side flow path which circulates an oil in the rod side oil chamber of the cylinder toward the piston side oil chamber via the outer flow path of the cylinder in an extension side stroke. The extension side flow path is provided with an extension side damping valve in its upstream side and with an extension side check valve in its downstream side. An intermediate portion between the extension side damping valve and the extension side check valve which are provided in the extension side flow path being communicated with the oil reservoir chamber. The damping force generating device has first and second base pistons which are arranged at two positions aligned along an axial direction of the cylinder. The compression side damping valve and the extension side check valve are respectively provided in the compression side flow path and the extension side flow path which are provided in the first base piston. The extension side damping valve and the compression side check valve are respectively provided in the extension side flow path and the compression side flow path which are provided in the second base piston. At least one of the first base piston and the second base piston is provided with a communication path communicating the intermediate portion between the compression side damping valve and the compression side check valve which are provided in the respective compression side flow paths of the first and second base pistons with the oil reservoir chamber, and communicating the intermediate portion between the extension side damping valve and the extension side check valve which are provided in the respective extension side flow paths of the first and second base pistons with the oil reservoir chamber. Accordingly, it is possible to prevent pressure in a rod side oil chamber from being fluctuated by setting a flow path resistance of a compression side damping valve, in a compression side stroke in which an oil in a piston side oil chamber flows out to the rod side oil chamber and an oil reservoir chamber, thereby avoiding a pause of a damping force at a time of an extension side reverse, in the hydraulic shock absorber. And it is possible to easily secure a flow path area between an oil chamber and an oil reservoir chamber of a cylinder so as to further securely avoid the pause of the damping force at a time of the extension side reverse, in the hydraulic shock absorber mentioned above.

EXPLANATIONS OF LETTERS OR NUMERALS 10 hydraulic shock absorber
11 damper case
12 damper tube
13 damper cylinder
13A outer tube
13B inner tube
13C outer flow path
14 piston rod
25 piston
27 oil chamber
27A piston side oil chamber
27B rod side oil chamber
31 air chamber
32 oil reservoir chamber
40 damping force generating device
41 to 43 extension and compression common flow path
44 communication path
50 first base piston
50A compression side flow path
50B extension side flow path
51 compression side damping valve
52 compression side check valve
60 second base piston
60A extension side flow path
60B compression side flow path
61 extension side damping valve
62 extension side check valve
70 bolt
100 hydraulic shock absorber
111 damper cylinder
111A outer tube
111B inner tube
111C outer flow path
112 piston rod
125 piston
127 oil chamber
127A piston side oil chamber
127B rod side oil chamber
131 air chamber
132 oil reservoir chamber
140 damping force generating device
141 to 143 extension and compression common flow path
144 communication path
150 first base piston
150A compression side flow path
150B extension side flow path
151 compression side damping valve
152 compression side check valve
160 second base piston
160A extension side flow path
160B compression side flow path 161 extension side damping valve
162 extension side check valve
170 bolt

The invention claimed is:

1. A hydraulic shock absorber comprising:
an oil chamber of a cylinder provided in a damper case which is attached to one of a vehicle body side and an axle side;
a piston rod attached to another of the vehicle body side and the axle side, the piston rod being inserted into the oil chamber;
a piston provided in a leading end portion of the piston rod;
the oil chamber of the cylinder being divided into a piston side oil chamber and a rod side oil chamber by the piston;
an oil reservoir chamber compensating a volumetric capacity of the piston rod which goes to and out of the oil chamber of the cylinder, the oil reservoir chamber being communicated with the oil chamber of the cylinder;
a damping force generating device provided between the piston side oil chamber and the rod side oil chamber of the cylinder, said damping force generating device having a compression side damping valve and an extension side damping valve;
an outer flow path communicating between the piston side oil chamber and the rod side oil chamber, the outer flow path being provided around the oil chamber of the cylinder in the damper case;
the damping force generating device being provided with at least one compression side flow path which circulates an oil in the piston side oil chamber of the cylinder toward the rod side oil chamber via the outer flow path of the cylinder in a compression side stroke, the compression side flow path being provided with the compression side damping valve in its upstream side and with a compression side check valve in its downstream side, and a compression intermediate portion between the compression side damping valve and the compression side check valve which are provided in the compression side flow path being communicated with the oil reservoir chamber; and
the damping force generating device being provided with at least one extension side flow path which circulates an oil in the rod side oil chamber of the cylinder toward the piston side oil chamber via the outer flow path of the cylinder in an extension side stroke, the extension side flow path being provided with the extension side damping valve in its upstream side and with an extension side check valve in its downstream side, and an extension intermediate portion between the extension side damping valve and the extension side check valve which are provided in the extension side flow path being communicated with the oil reservoir chamber, said compression intermediate portion and said extension intermediate portion having at least a common portion,
wherein the damping force generating device has first and second base pistons which are arranged at two positions aligned along an axial direction of the cylinder, the compression side damping valve and the extension side check valve are respectively provided in the compression side flow path and the extension side flow path which are provided in the first base piston, and the extension side damping valve and the compression side check valve are respectively provided in the extension side flow path and the compression side flow path which are provided in the second base piston, and at least one of the first base piston and the second base piston is provided with a communication path communicating the intermediate portion between the compression side damping valve and the compression side check valve which are provided in the respective compression side flow paths of the first and second base pistons with the oil reservoir chamber, and communicating the intermediate portion between the extension side damping valve and the extension side check valve which are provided in the respective extension side flow paths of the first and second base pistons with the oil reservoir chamber,
the oil reservoir chamber is provided around the periphery of the oil chamber of the cylinder and the outer flow path in the damper case, the first and second base pistons are fixedly provided around a bolt, and the second base piston is immobilized to a bottom portion in one end side of the cylinder, wherein the extension side flow paths and the compression side flow paths extend through the first base piston and the second base piston in a longitudinal direction of the hydraulic shock absorber, and the communication path extends through the first base piston or the second base piston in a direction transverse to the longitudinal direction.

2. The hydraulic shock absorber according to claim 1, wherein the damper case has a damper tube, the cylinder is inserted and fitted to an inner portion of said damper tube, the cylinder consists of an outer tube and an inner tube, the inner tube is inserted into the outer tube having a space between them, the oil chamber is formed in an inner portion of the inner tube, the outer flow path is formed between the outer tube and the inner tube, and the oil reservoir chamber is formed between the damper tube and the outer tube.

3. The hydraulic shock absorber according to claim 1, wherein the communication path is perforated from an intermediate portion of the extension side flow path to an outer peripheral portion facing to the oil reservoir chamber, in the first base piston.

4. The hydraulic shock absorber according to claim 1, wherein the communication path is perforated from an intermediate portion of the compression flow path to an outer peripheral portion facing to the oil reservoir chamber, in the second base piston.

5. The hydraulic shock absorber according to claim 1, wherein the damping force generating device is provided with a compression side damping force generating elastic element in the compression side check valve which is provided in a downstream side of the compression side flow path.

6. The hydraulic shock absorber according to claim 1, wherein the damping force generating device is provided with an extension side damping force generating elastic element in the extension side check valve which is provided in a downstream side of the extension side flow path.

7. The hydraulic shock absorber according to claim 1, wherein in the damper case, the cylinder is inserted and fitted to an inner portion of a damper tube, the cylinder consists of an outer tube and an inner tube, the oil chamber is formed in an inner portion of the inner tube, the outer flow path is formed between the outer tube and the inner tube, and the oil reservoir chamber is formed between the damper tube and the outer tube.

8. The hydraulic shock absorber according to claim 2, wherein the communication path is perforated from an intermediate portion of the extension side flow path to an outer peripheral portion facing to the oil reservoir chamber, in the first base piston.

9. The hydraulic shock absorber according to claim 2, wherein the communication path is perforated from an intermediate portion of the compression side flow path to an outer peripheral portion facing to the oil reservoir chamber, in the second base piston.

10. The hydraulic shock absorber according to claim 7, wherein the communication path is perforated from an intermediate portion of the extension side flow path to an outer peripheral portion facing to the oil reservoir chamber, in the first base piston.

11. The hydraulic shock absorber according to claim 7, wherein the communication path is perforated from an intermediate portion of the compression flow path to an outer peripheral portion facing to the oil reservoir chamber, in the second base piston.

* * * * *